US008427971B2

(12) United States Patent
Fischer et al.

(10) Patent No.: US 8,427,971 B2
(45) Date of Patent: Apr. 23, 2013

(54) ENHANCEMENT OF LTE RANDOM ACCESS PROCEDURE

(75) Inventors: Patrick Fischer, Bourg la Reine (FR); Remi Feuillette, Paris (FR); Dragan Vujcic, Orsay (FR)

(73) Assignee: LG Electronics Inc., Seoul (KR)

( * ) Notice: Subject to any disclaimer, the term of this patent is extended or adjusted under 35 U.S.C. 154(b) by 650 days.

(21) Appl. No.: 12/664,654

(22) PCT Filed: Jun. 19, 2008

(86) PCT No.: PCT/KR2008/003487
§ 371 (c)(1),
(2), (4) Date: Dec. 14, 2009

(87) PCT Pub. No.: WO2008/156321
PCT Pub. Date: Dec. 24, 2008

(65) Prior Publication Data
US 2010/0172299 A1 Jul. 8, 2010

Related U.S. Application Data

(60) Provisional application No. 60/945,071, filed on Jun. 19, 2007, provisional application No. 61/023,196, filed on Jan. 24, 2008.

(51) Int. Cl.
*G06F 11/00* (2006.01)
(52) U.S. Cl.
USPC ............ 370/252; 370/230; 370/310; 370/328
(58) Field of Classification Search .................. 370/229, 370/230, 235, 236, 310, 312, 328, 329, 330, 370/331, 252, 311
See application file for complete search history.

(56) References Cited

U.S. PATENT DOCUMENTS

| 6,145,108 | A | 11/2000 | Ketseoglou |
| 6,954,452 | B2 | 10/2005 | Moulsley et al. |
| 6,992,998 | B1 * | 1/2006 | Bhatoolaul et al. ............ 370/329 |
| 7,433,334 | B2 * | 10/2008 | Marjelund et al. ............ 370/329 |
| 7,701,961 | B2 * | 4/2010 | Lim et al. ...................... 370/445 |
| 8,014,359 | B2 * | 9/2011 | Cave et al. .................... 370/332 |
| 2001/0017881 | A1 | 8/2001 | Bhatoolaul et al. |

(Continued)

FOREIGN PATENT DOCUMENTS

| EP | 0994603 | 4/2000 |
| KR | 10-2007-0065101 | 6/2007 |
| KR | 10-2007-0081905 | 8/2007 |
| WO | 2007/1052972 | 5/2007 |

OTHER PUBLICATIONS

R. Masson, "E-UTRA RACH within the LTE System," Master's Degree Project, KTH Electrical Engineering, Feb. 2006.
J. Reig et al., "Random Access Channel (RACH) Parameters Optimization in WCDMA Systems," IEEE, pp. 4296-4300, Sep. 2004.

(Continued)

*Primary Examiner* — Kwang B Yao
*Assistant Examiner* — Nguyen Ngo
(74) *Attorney, Agent, or Firm* — Lee, Hong, Degerman, Kang & Waimey

(57) ABSTRACT

A method and apparatus for enhancement of the random access procedure of a Long-Term Evolution (LTE) system are provided. Enhancements include modeling one cycle in the random access procedure since only one counter is necessary and controlling the delay prior to the preamble transmission in order to reduce conflicts by multiple mobile terminals using the random access channel.

22 Claims, 32 Drawing Sheets

U.S. PATENT DOCUMENTS

| | | |
|---|---|---|
| 2001/0026547 A1 | 10/2001 | Moulsley et al. |
| 2002/0049068 A1 | 4/2002 | Koo et al. |
| 2002/0105929 A1 | 8/2002 | Chen et al. |
| 2005/0235190 A1 | 10/2005 | Miyazaki et al. |
| 2005/0276249 A1 | 12/2005 | Damnjanovic et al. |
| 2006/0018289 A1* | 1/2006 | Schulist et al. ............... 370/335 |
| 2007/0064665 A1* | 3/2007 | Zhang et al. ................... 370/343 |
| 2007/0142070 A1* | 6/2007 | Soldani et al. ................ 455/515 |
| 2007/0191024 A1 | 8/2007 | Kim et al. |
| 2007/0206531 A1 | 9/2007 | Pajukoski et al. |
| 2008/0192766 A1* | 8/2008 | Ranta-Aho et al. ........... 370/445 |

OTHER PUBLICATIONS

M. Chuah et al., "Access Priority Schemes in UMTS MAC," IEEE Wireless Communications and Networking Conference, pp. 781-786, Sep. 1999.

Y. Yang et al., "Analysis of Power Ramping Schemes for UTRA-FDD Random Access Channel," IEEE Transactions on Wireless Communications, vol. 4, No. 6, Nov. 2005.

* cited by examiner

FIG. 23
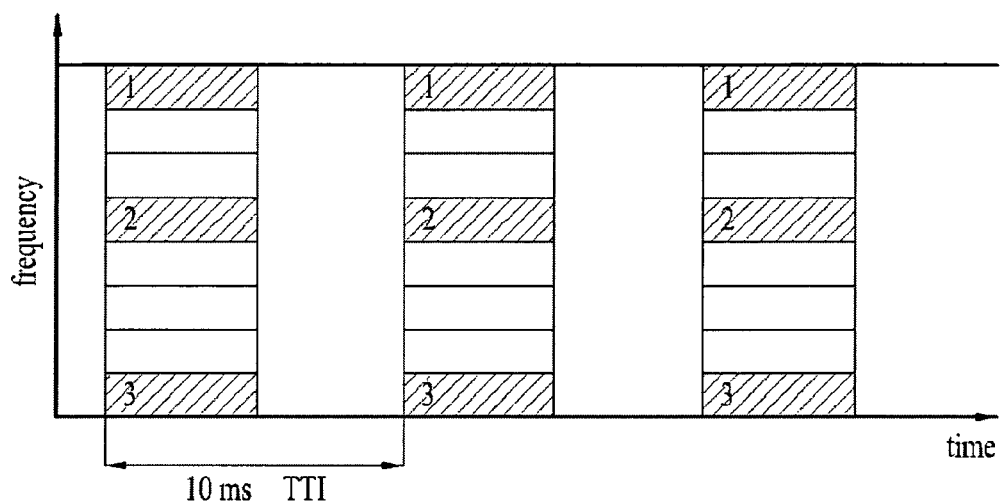
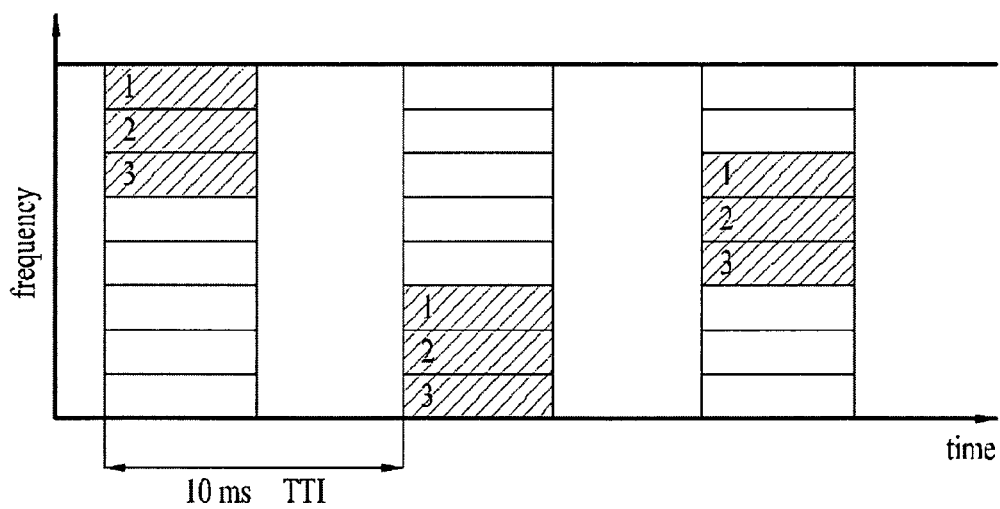

FIG. 24
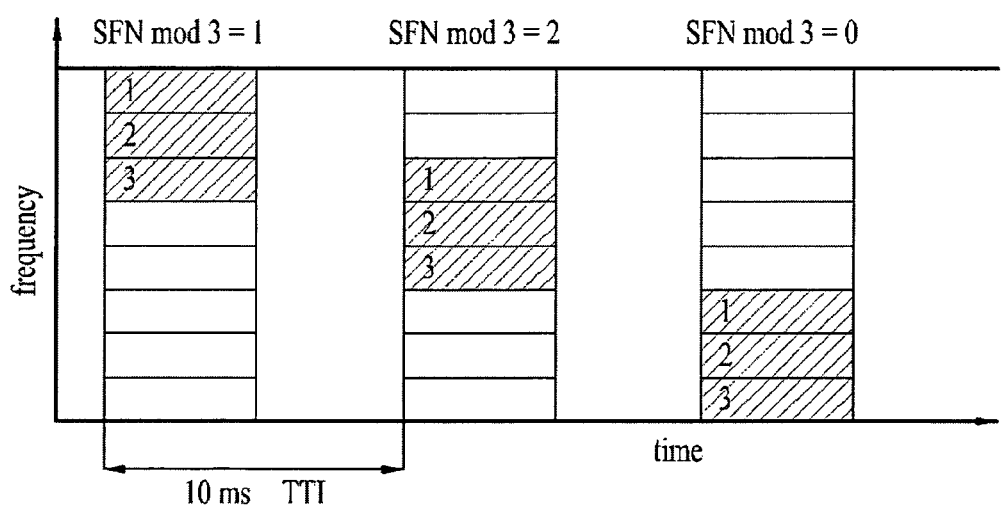
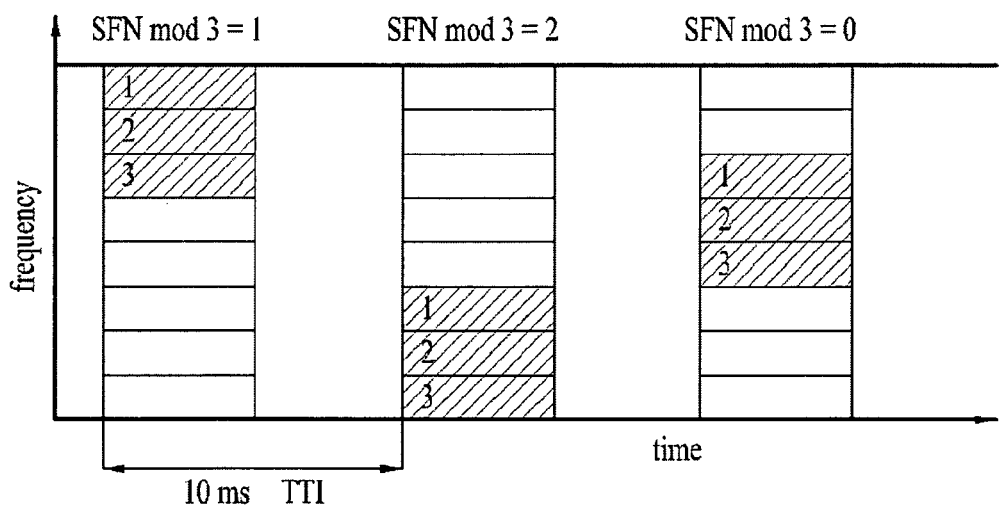

ENHANCEMENT OF LTE RANDOM ACCESS PROCEDURE

CROSS-REFERENCE TO RELATED APPLICATIONS

This application is the National Stage filing under 35 U.S.C. §371 of International Application No. PCT/KR2008/003487, filed on Jun. 19, 2008, which claims the benefit of U.S. Provisional Application Ser. Nos. 60/945,071, filed on Jun. 19, 2007, and 61/023,196, filed on Jan. 24, 2008.

TECHNICAL FIELD

The present invention is directed to an initial access procedure in a mobile terminal using a Random Access Channel (RACH) and, specifically, to enhancements in the random access procedure of a Long-Term Evolution (LTE) system.

BACKGROUND ART

A universal mobile telecommunication system (UMTS) is a European-type, third generation IMT-2000 mobile communication system that has evolved from a European standard known as Global System for Mobile communications (GSM). UMTS is intended to provide an improved mobile communication service based upon a GSM core network and wideband code division multiple access (W-CDMA) wireless connection technology. In December 1998, a Third Generation Partnership Project (3GPP) was formed by the ETSI of Europe, the ARIB/TTC of Japan, the T1 of the United States, and the TTA of Korea. The 3GPP creates detailed specifications of UMTS technology.

In order to achieve rapid and efficient technical development of the UMTS, five technical specification groups (TSG) have been created within the 3GPP for standardizing the UMTS by considering the independent nature of the network elements and their operations. Each TSG develops, approves, and manages the standard specification within a related region. The radio access network (RAN) group (TSG-RAN) develops the standards for the functions, requirements, and interface of the UMTS terrestrial radio access network (UTRAN), which is a new radio access network for supporting W-CDMA access technology in the UMTS.

FIG. 1 provides an overview of a UMTS network. The UMTS network includes a mobile terminal or user equipment (UE) 1, a UTRAN 2 and a core network (CN) 3.

The UTRAN 2 includes several radio network controllers (RNCs) 4 and NodeBs 5 that are connected via the $I_{ub}$ interface. Each RNC 4 controls several NodeBs 5. Each NodeB 5 controls one or several cells, where a cell covers a given geographical area on a given frequency.

Each RNC 4 is connected via the Iu interface to the CN 3 or towards the mobile switching center (MSC) 6 entity of the CN and the general packet radio service (GPRS) support Node (SGSN) 7 entity. RNCs 4 can be connected to other RNCs via the $I_{ur}$ interface. The RNC 4 handles the assignment and management of radio resources and operates as an access point with respect to the CN 3.

The NodeBs 5 receive information sent by the physical layer of the UE 1 via an uplink and transmit data to the UE 1 via a downlink. The Node-Bs 5 operate as access points of the UTRAN 2 for the UE 1.

The SGSN 7 is connected to the equipment identity register (EIR) 8 via the $G_f$ interface, to the MSC 6 via the $G_s$ interface, to the gateway GPRS support node (GGSN) 9 via the $G_N$ interface, and to the home subscriber server (HSS) via the $G_R$ interface.

The EIR 8 hosts lists of UEs 1 that are allowed to use the network. The EIR 8 also hosts lists of UEs 1 that are not allowed to use on the network.

The MSC 6, which controls the connection for circuit switched (CS) services, is connected towards the media gateway (MGW) 11 via the Ng interface, towards the EIR 8 via the F interface, and towards the HSS 10 via the D interface.

The MGW 11 is connected towards the HSS 10 via the C interface and also to the public switched telephone network (PSTN). The MGW 11 also allows the codecs to adapt between the PSTN and the connected RAN.

The GGSN 9 is connected to the HSS 10 via the $G_C$ interface and to the Internet via the $G_i$ interface. The GGSN 9 is responsible for routing, charging and separation of data flows into different radio access bearers (RABs). The HSS 10 handles the subscription data of users.

The UTRAN 2 constructs and maintains an RAB for communication between a UE 1 and the CN 3. The CN 3 requests end-to-end quality of service (QoS) requirements from the RAB and the RAB supports the QoS requirements set by the CN 3. Accordingly, the UTRAN 2 can satisfy the end-to-end QoS requirements by constructing and maintaining the RAB.

The services provided to a specific UE 1 are roughly divided into CS services and packet switched (PS) services. For example, a general voice conversation service is a CS service and a Web browsing service via an Internet connection is classified as a PS service.

The RNCs 4 are connected to the MSC 6 of the CN 3 and the MSC is connected to the gateway MSC (GMSC) that manages the connection with other networks in order to support CS services. The RNCs 4 are connected to the SGSN 7 and the gateway GGSN 9 of the CN 3 to support PS services.

The SGSN 7 supports packet communications with the RNCs. The GGSN 9 manages the connection with other packet switched networks, such as the Internet.

FIG. 2 illustrates a structure of a radio interface protocol between a UE 1 and the UTRAN 2 according to the 3GPP radio access network standards. As illustrated In FIG. 2, the radio interface protocol has horizontal layers comprising a physical layer, a data link layer, and a network layer, and has vertical planes comprising a user plane (U-plane) for transmitting user data and a control plane (C-plane) for transmitting control information. The U-plane is a region that handles traffic information with the user, such as voice or Internet protocol (IP) packets. The C-plane is a region that handles control information for an interface with a network as well as maintenance and management of a call. The protocol layers can be divided into a first layer (L1), a second layer (L2), and a third layer (L3) based on the three lower layers of an open system interconnection (OSI) standard model.

The first layer (L1), or physical layer, provides an information transfer service to an upper layer by using various radio transmission techniques. The physical layer is connected to an upper layer, or medium access control (MAC) layer, via a transport channel. The MAC layer and the physical layer exchange data via the transport channel.

The second layer (L2) includes a MAC layer, a radio link control (RLC) layer, a broadcast/multicast control (BMC) layer, and a packet data convergence protocol (PDCP) layer. The MAC layer handles mapping between logical channels and transport channels and provides allocation of the MAC parameters for allocation and re-allocation of radio resources. The MAC layer is connected to an upper layer, or the radio link control (RLC) layer, via a logical channel.

Various logical channels are provided according to the type of information transmitted. A control channel is generally used to transmit information of the C-plane and a traffic channel is used to transmit information of the U-plane. A logical channel may be a common channel or a dedicated channel depending on whether the logical channel is shared.

FIG. 3 illustrates the different logical channels that exist. Logical channels include a dedicated traffic channel (DTCH), a dedicated control channel (DCCH), a common traffic channel (CTCH), a common control channel (CCCH), a broadcast control channel (BCCH), and a paging control channel (PCCH), or a Shared Control Channel (SCCH), as well as other channels. The BCCH provides information including information utilized by a UE 1 to access a system. The PCCH is used by the UTRAN 2 to access a UE 1.

Additional traffic and control channels are introduced in the Multimedia Broadcast Multicast Service (MBMS) standard for the purposes of MBMS. The MBMS point-to-multipoint control channel (MCCH) is used for transmission of MBMS control information. The MBMS point-to-multipoint traffic channel (MTCH) is used for transmitting MBMS service data. The MBMS scheduling channel (MSCH) is used to transmit scheduling information.

The MAC layer is connected to the physical layer by transport channels. The MAC layer can be divided into a MAC-b sub-layer, a MAC-d sub-layer, a MAC-c/sh sub-layer, a MAC-hs sub-layer and a MAC-m sublayer according to the type of transport channel being managed.

The MAC-b sub-layer manages a broadcast channel (BCH), which is a transport channel handling the broadcasting of system information. The MAC-c/sh sub-layer manages a common transport channel, such as a forward access channel (FACH) or a downlink shared channel (DSCH), which is shared by a plurality of UEs 1, or in the uplink the radio access channel (RACH). The MAC-m sublayer may handle MBMS data.

FIG. 4 illustrates the possible mapping between the logical channels and the transport channels from a UE 1 perspective. FIG. 5 illustrates the possible mapping between the logical channels and the transport channels from a UTRAN 2 perspective.

The MAC-d sub-layer manages a dedicated channel (DCH), which is a dedicated transport channel for a specific UE 1. The MAC-d sublayer is located in a serving RNC 4 (SRNC) that manages a corresponding UE 1. One MAC-d sublayer also exists in each UE 1.

The RLC layer supports reliable data transmissions and performs segmentation and concatenation on a plurality of RLC service data units (SDUs) delivered from an upper layer depending of the RLC mode of operation. The RLC layer adjusts the size of each RLC SDU received from the upper layer in an appropriate manner based upon processing capacity and then creates data units by adding header information. The data units, or protocol data units (PDUs), are transferred to the MAC layer via a logical channel. The RLC layer includes a RLC buffer for storing the RLC SDUs and/or the RLC PDUs.

The BMC layer schedules a cell broadcast (CB) message transferred from the CN 3. The BMC layer broadcasts the CB message to UEs 1 positioned in a specific cell or cells.

The PDCP layer is located above the RLC layer. The PDCP layer is used to transmit network protocol data, such as the IPv4 or IPv6, efficiently on a radio interface with a relatively small bandwidth. The PDCP layer reduces unnecessary control information used in a wired network, a function called header compression, for this purpose.

The radio resource control (RRC) layer located at the lowest portion of the third layer (L3) is only defined in the C-plane. The RRC layer controls the transport channels and the physical channels in relation to setup, reconfiguration, and the release or cancellation of the radio bearers (RBs).

A RB signifies a service provided by the second layer (L2) for data transmission between a UE 1 and the UTRAN 2. The set up of the RB generally refers to the process of stipulating the characteristics of a protocol layer and a channel required for providing a specific data service and setting the respective detailed parameters and operation methods. The RRC also handles user mobility within the RAN and additional services, such as location services.

Not all different possibilities for the mapping between the RBs and the transport channels for a given UE 1 are available all the time. The UE 1/UTRAN 2 deduce the possible mapping depending on the UE state and the procedure presently executed by the UE/UTRAN.

The different transport channels are mapped onto different physical channels. The configuration of the physical channels is given by RRC signaling exchanged between the RNC 4 and the UE 1.

Initial access is a procedure whereby a UE 1 sends a first message to the UTRAN 2 using a common uplink channel, specifically the Random Access Channel (RACH). For both GSM and UMTS systems, the initial access procedure involves the UE 1 transmitting a connection request message that includes a reason for the request and receiving a response from the UTRAN 2 indicating the allocation of radio resources for the requested reason.

There are several reasons, or establishment causes, for sending a connection request message. Table 1 indicates the establishment causes specified in UMTS, specifically in 3GPP TS 25.331.

TABLE 1

| Establishment Causes Originating Conversational Call |
| --- |
| Originating Streaming Call |
| Originating Interactive Call |
| Originating Background Call |
| Originating Subscribed traffic Call |
| Terminating Conversational Call |
| Terminating Streaming Call |
| Terminating Interactive Call |
| Terminating Background Call |
| Emergency Call |
| Inter-RAT cell re-selection |
| Inter-RAT cell change order |
| Registration |
| Detach |
| Originating High Priority Signaling |
| Originating Low Priority Signaling |
| Call re-establishment |
| Terminating High Priority Signaling |
| Terminating Low Priority Signaling |

The "Originating call" establishment cause indicates that the UE 1 wants to setup a connection, for example, a speech connection. The "terminating call" establishment cause indicates that that UE 1 answers to paging. The "registration" establishment cause indicates that that the user wants to register only to the network.

A physical random access procedure is used to send information over the air. The physical random access transmission is under control of a higher layer protocol, which performs important functions related to priority and load control. This procedure differs between GSM and UMTS radio systems.

As the present invention is related to UMTS enhancement and evolution, the W-CDMA random access procedure is detailed herein. Although the present invention is explained in the context of UMTS evolution, the present invention is not so limited.

The transport channel RACH and two physical channels, Physical Random Access Channel (PRACH) and Acquisition Indication Channel (AICH), are utilized in this procedure. The transport channels are channels supplied by the physical layer to the protocol layer of the MAC layer. There are several types of transport channels to transmit data with different properties and transmission formats over the physical layer.

Physical channels are identified by code and frequency in Frequency Division Duplex (FDD) mode and are generally based on a layer configuration of radio frames and timeslots. The form of radio frames and timeslots depends on the symbol rate of the physical channel.

A radio frame is the minimum unit in the decoding process, consisting of 15 time slots. A time slot is the minimum unit in the Layer 1 bit sequence. Therefore, the number of bits that can be accommodated in one time slot depends on the physical channel.

The transport channel RACH is an uplink common channel used for transmitting control information and user data. The transport channel RACH is utilized in random access and used for low-rate data transmissions from a higher layer. The RACH is mapped to an uplink physical channel, specifically the PRACH. The AICH is a downlink common channel, which exists as a pair with PRACH used for random access control.

The transmission of PRACH is based on a slotted ALOHA approach with fast acquisition indication. The UE randomly selects an access resource and transmits a RACH preamble part of a random access procedure to the network.

A preamble is a short signal that is sent before the transmission of the RACH connection request message. The UE 1 repeatedly transmits the preamble by increasing the transmission power each time the preamble is sent until it receives the Acquisition Indicator (AI) on AICH, which indicates the detection of the preamble by the UTRAN 2. The UE 1 stops the transmission of the preamble once it receives the AI and sends the message part at the power level equal to the preamble transmission power at that point, adding an offset signaled by the UTRAN 2. FIG. 6 illustrates a power ramping procedure.

This random access procedure avoids a power ramping procedure for the entire message. A power ramping procedure would create more interference due to unsuccessfully sent messages and would be less efficient due to a larger delay since it would take much more time to decode the message before an acknowledgement could be transmitted to indicate successful receipt of the message.

The main characteristics of the RACH is that it is a contention based channel subject to collisions due to simultaneous access of several users, which may preclude decoding of the initial access message by the network. The UE 1 can start the random access transmission of both preambles and message only at the beginning of an access slot. This access method is, therefore, a type of slotted ALOHA approach with fast acquisition indication.

The time axis of both the RACH and the AICH is divided into time intervals or access slots. There are 15 access slots per two frames, with each frame having a length of 10 ms or 38400 chips, and the access slots are spaced 1.33 ms or 5120 chips apart. FIG. 7 illustrates the number and spacing of access slots.

The UTRAN 2 signals information regarding which access slots are available for random access transmission and the timing offsets to use between RACH and AICH, between two successive preambles and between the last preamble and the message. For example, if the AICH transmission timing is 0 and 1, it is sent three and four access slots after the last preamble access slot transmitted, respectively. FIG. 8 illustrates the timing of the preamble, AI and message part.

The timing at which the UE 1 can send the preamble is divided by random access sub channels. A random access sub channel is a subset including the combination of all uplink access slots. There are 12 random access sub channels. A random access sub channel consists of the access slots indicated in Table 2.

TABLE 2

| SFN modulo 8 of corresponding P-CCPCH frame | Sub-channel number | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| 0 | 0 | 1 | 2 | 3 | 4 | 5 | 6 | 7 | | | | |
| 1 | 12 | 13 | 14 | | | | | | 8 | 9 | 10 | 11 |
| 2 | | | | 0 | 1 | 2 | 3 | 4 | 5 | 6 | 7 | |
| 3 | 9 | 10 | 11 | 12 | 13 | 14 | | | | | | 8 |
| 4 | 6 | 7 | | | | | 0 | 1 | 2 | 3 | 4 | 5 |
| 5 | | | 8 | 9 | 10 | 11 | 12 | 13 | 14 | | | |
| 6 | 3 | 4 | 5 | 6 | 7 | | | | | 0 | 1 | 2 |
| 7 | | | | | | 8 | 9 | 10 | 11 | 12 | 13 | 14 |

The preamble is a short signal that is sent before the transmission of the RACH message. A preamble consists of 4096 chips, which is a sequence of 256 repetitions of Hadamard codes of length 16 and scrambling codes assigned from the upper layer.

The Hadamard codes are referred to as the signature of the preamble. There are 16 different signatures and a signature is randomly selected from available signature sets on the basis of Access Service Classes (ASC) and repeated 256 times for each transmission of the preamble part. Table 3 lists the preamble signatures.

The message part is spread by Orthogonal Variable Spreading Factor (OVSF) codes that are uniquely defined by the preamble signature and the spreading codes for use as the preamble signature. The 10 ms long message part radio frame is divided into 15 slots, each slot consisting of 2560 chips.

Each slot includes a data part and a control part that transmits control information, such as pilot bits and TFCI. The data part and the control part are transmitted in parallel. The 20 ms long message part consists of two consecutive message part radio frames. The data part consists of 10*2 k bits, where k=0, 1, 2, 3, which corresponds to a Spreading Factor (SF) of 256, 128, 64, 32. FIG. 9 illustrates the structure of the random access message part.

TABLE 3

| Preamble signature | Value of n | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| $P_0(n)$ | 1 | 1 | 1 | 1 | 1 | 1 | 1 | 1 | 1 | 1 | 1 | 1 | 1 | 1 | 1 | 1 |
| $P_1(n)$ | 1 | -1 | 1 | -1 | 1 | -1 | 1 | -1 | 1 | -1 | 1 | -1 | 1 | -1 | 1 | -1 |
| $P_2(n)$ | 1 | 1 | -1 | -1 | 1 | 1 | -1 | -1 | 1 | 1 | -1 | -1 | 1 | 1 | -1 | -1 |
| $P_3(n)$ | 1 | -1 | -1 | 1 | 1 | -1 | -1 | 1 | 1 | -1 | -1 | 1 | 1 | -1 | -1 | 1 |
| $P_4(n)$ | 1 | 1 | 1 | 1 | -1 | -1 | -1 | -1 | 1 | 1 | 1 | 1 | -1 | -1 | -1 | -1 |
| $P_5(n)$ | 1 | -1 | 1 | -1 | -1 | 1 | -1 | 1 | 1 | -1 | 1 | -1 | -1 | 1 | -1 | 1 |
| $P_6(n)$ | 1 | 1 | -1 | -1 | -1 | -1 | 1 | 1 | 1 | 1 | -1 | -1 | -1 | -1 | 1 | 1 |
| $P_7(n)$ | 1 | -1 | -1 | 1 | -1 | 1 | 1 | -1 | 1 | -1 | -1 | 1 | -1 | 1 | 1 | -1 |
| $P_8(n)$ | 1 | 1 | 1 | 1 | 1 | 1 | 1 | 1 | -1 | -1 | -1 | -1 | -1 | -1 | -1 | -1 |
| $P_9(n)$ | 1 | -1 | 1 | -1 | 1 | -1 | 1 | -1 | -1 | 1 | -1 | 1 | -1 | 1 | -1 | 1 |
| $P_{10}(n)$ | 1 | 1 | -1 | -1 | 1 | 1 | -1 | -1 | -1 | -1 | 1 | 1 | -1 | -1 | 1 | 1 |
| $P_{11}(n)$ | 1 | -1 | -1 | 1 | 1 | -1 | -1 | 1 | -1 | 1 | 1 | -1 | -1 | 1 | 1 | -1 |
| $P_{12}(n)$ | 1 | 1 | 1 | 1 | -1 | -1 | -1 | -1 | -1 | -1 | -1 | -1 | 1 | 1 | 1 | 1 |
| $P_{13}(n)$ | 1 | -1 | 1 | -1 | -1 | 1 | -1 | 1 | -1 | 1 | -1 | 1 | 1 | -1 | 1 | -1 |
| $P_{14}(n)$ | 1 | 1 | -1 | -1 | -1 | -1 | 1 | 1 | -1 | -1 | 1 | 1 | 1 | 1 | -1 | -1 |
| $P_{15}(n)$ | 1 | -1 | -1 | 1 | -1 | 1 | 1 | -1 | -1 | 1 | 1 | -1 | 1 | -1 | -1 | 1 |

The AICH consists of a repeated sequence of 15 consecutive access slots, each slot having a length of 40 bit intervals or 5120 chips. Each access slot includes two parts, an Acquisition Indicator (AI) part consisting of 32 real-valued signals, such as a0 ?a31, and a part having a length of 1024 chips during which transmission is switched off. FIG. 10 illustrates the structure of the AICH.

When the UTRAN 2 detects transmission of a RACH preamble having a certain signature in an RACH access slot, the UTRAN repeats this signature in the associated AICH access slot. Therefore, the Hadamard code used as the signature for the RACH preamble is modulated onto the AI part of the AICH.

The acquisition indicator corresponding to a signature can have a value of +1, -1 or 0 depending on whether a positive acknowledgement (ACK), a negative acknowledgement (NACK) or no acknowledgement is received in response to a specific signature. The positive polarity of the signature indicates that the preamble has been acquired and the message can be sent.

The negative polarity indicates that the preamble has been acquired and the power ramping procedure shall be stopped, but the message shall not be sent. This negative acknowledgement is used when a received preamble cannot be processed at the present time due to congestion in the UTRAN 2 and the UE 1 must repeat the access attempt some time later.

All UEs 1 are members of one of ten randomly allocated mobile populations, defined as Access Classes (AC) 0 to 9. The population number is stored in the Subscriber Identity Module (SIM)/Universal Subscriber Identity Module (USIM). UEs 1 may also be members of one or more out of 5 special categories of Access Classes 11 to 15, which are allocated to specific high priority users and the information also stored in the SIM/USIM. Table 4 lists the special AC and their allocation.

TABLE 4

| AC | Allocation |
|---|---|
| 15 | PLMN Staff |
| 14 | Emergency Services |
| 13 | Public Utilities (e.g. water/gas suppliers) |
| 12 | Security Services |
| 11 | |

The UTRAN 2 performs the random access procedure at protocol layer L2 by determining whether to permit the UE 1 to use a radio access resource based primarily upon the AC to which the UE belongs.

It will be desirable to prevent UE 1 users from making access attempts, including emergency call attempts, or responding to pages in specified areas of a Public Land Mobile Network (PLMN) under certain circumstances. Such situations may arise during states of emergency or where 1 or more co-located PLMNs has failed. Broadcast messages should be available on a cell-by-cell basis to indicate the class(es) of subscribers barred from network access. The use of this facility allows the network operator to prevent overload of the access channel under critical conditions.

Access attempts are allowed if the UE 1 is a member of at least one AC that corresponds to the permitted classes as signaled over the air interface and the AC is applicable in the serving UTRAN 2. Access attempts are otherwise not allowed. Any number of these AC may be barred at any one time. Access Classes are applicable as indicated in Table 5.

TABLE 5

| AC | Applicability |
|---|---|
| 0-9 | Home and Visited PLMNs |
| 11 and 15 | Home PLMN only |
| 12, 13, 14 | Home PLMN and visited PLMNs of home country only |

An additional control bit for AC 10 is also signaled over the air interface to the UE 1. This control bit indicates whether access to the UTRAN 2 is allowed for Emergency Calls for UEs 1 with access classes 0 to 9 or without an International Mobile Subscriber Identity (IMSI). Emergency calls are not allowed if both AC 10 and the relevant AC, 11 to 15 are barred for UEs 1 with access classes 11 to 15. Emergency calls are otherwise allowed.

The AC are mapped to ASC In the UMTS. There are eight different priority levels defined, specifically ASC 0 to ASC 7, with level 0 representing the highest priority.

Access Classes shall only be applied at initial access, such as when sending an RRC Connection Request message. A mapping between AC and ASC shall be indicated by the information element "AC-to-ASC mapping" in System Information Block type 5. The correspondence between AC and ASC is indicated in Table 6.

TABLE 6

| | AC | | | | | | |
|---|---|---|---|---|---|---|---|
| | 0 ?9 | 10 | 11 | 12 | 13 | 14 | 15 |
| ASC | $1^{st}$ IE | $2^{nd}$ IE | $3^{rd}$ IE | $4^{th}$ IE | $5^{th}$ IE | $6^{th}$ IE | $7^{th}$ IE |

In Table 6, "nth IE" designates an ASC number i in the range 0-7 to AC. The UE 1 behavior is unspecified if the ASC indicated by the "$n_{th}$ IE" is undefined.

The parameters implied by the respective ASC are utilized for random access. A UE 1 that is a member of several ACs selects the ASC for the highest AC number. The AC is not applied in connected mode.

An ASC consists of a subset of RACH preamble signatures and access slots that are allowed for the present access attempt and a persistence value corresponding to a probability, $Pv \leq 1$, to attempt a transmission. Another important mechanism to control random access transmission is a load control mechanism that reduces the load of incoming traffic when the collision probability is high or when the radio resources are low.

The UMTS random access procedure is illustrated in FIG. 11. Signatures are transmitted from the UE 1 to the NodeB 5 during a ramping cycle of the UMTS random access procedure until the NodeB sends an ACK or a NACK to the UE. The UE 1 sends the message to the Node-B 5 upon receiving an ACK corresponding to a transmitted signature.

The ramping cycle is repeated by the MAC layer up to a maximum allowed number of repetitions for this layer if the UE 1 receives a NACK or no answer from the Node-B 5. The entire procedure can be repeated by the RRC if no positive acknowledgement has been received after the maximum allowed number of repetitions by the MAC layer. A persistency value is attributed to a UE 1 that tries to access the RACH. The persistency value consists of a random time that the UE 1 must wait before transmitting a preamble. The random time is intended to resolve a potential overload and to reduce the likelihood that two UEs 1 that have started the ramping cycle simultaneously fail due to their mutual interference and restart the ramping cycle again at the same time. The ramping cycle corresponds to several preamble transmissions before the back-off procedure in the MAC layer and between each of these transmissions the power is incremented by the ramping cycle.

The persistency in UMTS is only used before the first preamble transmission of a ramping cycle. Therefore, there will not be any delay similar to the persistency value between two consecutive attempts if the UE 1 makes more than one attempt.

Two other cycles are distinguished in UMTS, each one allowing several random access attempts with several ramping cycles and introducing delay of related timers before each attempt. These cycles and the corresponding timers are handled by, respectively, the MAC and RRC layers:

The first cycle is a back-off procedure in the MAC layer when a ramping cycle is over or, in other words, the maximum number of preamble transmissions has been reached for the physical layer. The back-off procedure consists of a back-off timer, whose expiration time defines a time the UE 1 has to wait before restarting the ramping cycle, and a counter, which defines a maximum number of back-off procedures before the procedure transfers to the RRC level.

The second cycle is performed in the lower layers where a counter allows several random access attempts and a delay timer (T300) at the RRC level introduces additional delay. The UE 1 can no longer attempt random access and transitions to an IDLE mode when the counter reaches its maximum value. This cycle allows the RRC layer to take over and eventually stop the procedure, such as when the RRC receives new information.

FIG. 11 illustrates the elementary steps of the random access procedure, with a clear illustration of the number of random access attempts at the RRC, MAC and PHY layers. As illustrated in FIG. 11, a UE 1 accesses RACH (START) in order to transmit a message.

The UE 1 is allowed several random access attempts at different levels, specifically the RRC, MAC and physical layers. A counter will be incremented at each level to count the number of random access attempts. Each counter (V300, Mcurrent and Ncurrent) are set to an initial value of zero before the first random access attempt at the corresponding level.

The UE 1 retrieves RACH information on the BCH, such as available signatures for random access and power ramping information (S100). The UE 1 then randomly selects a signature (S102).

It is then determined whether a persistency value must be applied (S104). A persistency value is applied (S106) if necessary and the UE 1 must wait for the persistency timer to expire before continuing the random access procedure. The persistency value may be chosen randomly, but may still depend on the ASC or on the number of random access attempts the UE 1 has already performed (Ncurrent).

The random access procedure may be optimized by distinguishing two different situations according to the reason the UE 1 has initiated the random access procedure. The persistency test is applied even for the first attempt if the random access is related to TA update or counting or other requests related to MBMS. The persistency is not applied in all the other cases, such as for the first random access attempt at the PHY layer.

The UE 1 sends the PHY ACCESS REQ message to the Node-B 5 to request random access (S108). It is then determined if the random access was successful (S110) and the random access procedure is complete if the random access was successful. It is determined if the maximum number of random access attempts have been made at the PHY layer if the random access was not successful (S112).

Power ramping is applied by incrementing power by one step (S114), a PHY layer access counter (Ncurrent) is incremented (S116), and the random access procedure continues by determining whether a persistency value must be applied (S104) if the maximum number of allowed random access attempts at the PHY layer (Nmax) has not been reached. It is determined if the maximum number of random access attempts for the MAC layer has been reached (S118) by comparing a counter (Mcurrent) to the maximum number of allowed random access attempts at the MAC layer (Mmax) if the maximum number of random attempts for the physical layer has been reached.

The back-off procedure is applied if the maximum number of allowed random access attempts for the MAC layer has not been reached. A MAC access cycle counter (Mcurrent) is incremented, the PHY layer access counter (Ncurrent) is initialized (S122) and the UE 1 must wait for the back-off timer to expire (S124) before continuing the random access procedure by retrieving RACH information (S100). It is determined if the maximum number of random access attempts at the RRC layer has been reached (S126) by comparing an RRC access counter (V300) to the maximum number of allowed random access attempts at the RRC layer (N300) if the maximum number of allowed random access attempts for the MAC layer has been reached.

The UE transitions to IDLE mode if the maximum number of allowed random access attempts at the RRC layer (N300) has been reached. The UE 1 must wait for an RRC timer (T300) to expire (S128), increment the RRC access counter (V300) (S130), and initialize the MAC access cycle counter (Mcurrent) (S132) before continuing the random access procedure by retrieving RACH information (S100).

The long-term evolution of UMTS is under discussion by the 3rd generation partnership project (3GPP) that standardized UMTS. The 3GPP Long-Term Evolution (LTE) project is a technology for enabling high-speed packet communications. Many schemes have been proposed for the LTE objective including those that aim to reduce user and provider costs, improve service quality, and expand and improve coverage and system capacity. The 3GPP initiated the LTE to ensure competitiveness of radio-access networks for ten years and beyond. LTE will not lead to a standard but to evolved releases of the UMTS standards. The goals of LTE are increased spectrum efficiency, lower costs, improved services and better integration with other standards. The requirements for data rates are indicated in Table 7.

FIG. 12 illustrates the architecture of an LTE system. Each aGW 115 is connected to one or several access Gateways (aGW) 115. An aGW 115 is connected to another node (not shown) that allows access to the Internet and/or other networks, such as GSM, UMTS, and WLAN.

TABLE 7

| Networks | EDGE | UMTS | UMTS (HS-DPA) | LTE |
|---|---|---|---|---|
| Theoretical peak data rate | 473.6 kbit/s | 2 Mbit/s | 14.4 Mbit/s | 100 Mbit/s |
| Measured peak data rate | 180 kbit/s | 384 kbit/s | 3.6 Mbit/s | 50 Mbits/s |

The 3G LTE requires reduced cost per bit, increased service availability, flexible use of a frequency band, simple structure, an open interface, and adequate power consumption of a UE 1 as an upper-level requirement. The UTRAN 2 generally corresponds to the E-UTRAN (Evolved-UTRAN) and the NodeB 5 and/or RNC 4 correspond to e-NodeB (eNB) 5 in the LTE system.

The LTE is a new air interface based on multicarrier on orthogonal frequency division multiplexing (OFDM) for downlink transmissions and based on single carrier DFT-S-OFDM (Discrete Fourier Transform Spread Orthogonal Frequency Division Multiplexing) for uplink transmissions. The aGW 115 network is entirely optimized for only packet switched data and circuit switched data is not supported.

LTE provides a flexible spectrum management since the specifications are designed for multiple bandwidth allocations, specifically 1.4, 3, 5, 10, 15 and 20 MHz, whereas the former CDMA systems required 5 MHz band. Peak data rates, coverage, high-speed terminals and delay are particularly important.

A layer can be seen as a set of procedures that grant services for upper layers. The physical layer offers data transport services to higher layers. The radio interface is the interface between the UE 1 and the aGW 115. The radio interface is composed of layer1, layer2, and layer3. Each layer offers its own set of services, such as segmentation, in-sequence delivery, or error correction trough the use of automatic repeat request (ARQ) and hybrid automatic repeat request (HARQ).

FIG. 13 illustrates the radio interface architecture for LTE. The MAC and RRC layers are sub-layers of layer2. The arrows represent primitives or service access points. A flow of bits is called a channel. The channels between the MAC and RRC layers are logical channels and are defined by the type of information they carry. A general classification of logical channels can be made by separating the control channels used for transfer of control-plane information from the traffic channels used for transfer of user-plane information.

The channels between the PHY and MAC layers are transport channels characterized by the way information is transmitted over the air interface. The time and frequency resources used by a specific channel are called a physical channel.

The physical layer provides data transport services to higher layers. The access to these services is through the use of a transport channel via the MAC sub-layer. The functions performed by the physical layer in order to provide the data transport service are listed in Table 8.

TABLE 8

Error detection on the transport channel and indication to higher layers
Encoding/decoding of the transport channel
Hybrid ARQ soft-combining
Rate matching of the coded transport channel to physical channels
Mapping of the coded transport channel onto physical channels
Power weighting of physical channels
Modulation and demodulation of physical channels
Frequency and time synchronization
Radio characteristics measurements and indication to higher layers
Multiple Input Multiple Output (MIMO) antenna processing
Beamforming
RF processing The physical layer receives and passes information from and to the MAC sub-layer. For example, the MAC scheduler indicates to the PHY layer the modulation scheme to use for transmitting data, such as QPSK, 16QAM, or 64QAM, and the channel quality indicators (CQI) are reported to the RRC layer.

Layer 1 is responsible for the transport of data, such as channel coding, segmentation, and scrambling codes, between a UE 1 and an eNB 105. Layer 2 controls resource assignment.

The procedures performed by the physical layer are Cell search, Power control, Uplink synchronization, Random access and HARQ. Through the control of physical layer resources in the frequency domain as well as in the time and power domain, implicit support of interference coordination is provided in LTE.

Cell search is the procedure by which a UE 1 selects an eNB 5 and a cell from among all detected eNB's. Power control is the procedure used to set the UE 1 transmitted power to the most appropriate value. Uplink synchronization is the procedure used to align the UE 1 local oscillator to the eNB 5 clock in the frequency domain. Random access is the procedure used by the UE 1 to obtain time synchronization with an eNB 5. HARQ is the procedure by which a receiver can acknowledge the correct reception of transport blocks from a transmitter.

Frequency and time resources are shared according to a multiple access scheme in mobile networks. This scheme is based on OFDM in the downlink and single-carrier frequency division multiple access (SC-FDMA) in the uplink. Both schemes use cyclic prefixes (CP) and will be further detailed later.

FIG. 14 illustrates the LTE frame structure. The basic unit of time is a slot with a duration fixed at 0.5 ms. A subframe is 1 ms and consists of two slots. A radio frame is 10 ms and consists of ten subframes. This frame structure is applicable to both Frequency division duplex (FDD) and Time Division Duplex (TDD).

Ten subframes are available for downlink transmission and ten subframes are available for uplink transmissions in each 10 ms interval for FDD. A subframe is either allocated to downlink or uplink transmission for TDD. Uplink and downlink transmissions are separated in the frequency domain.

A grid of resource elements describes the signals transmitted in each slot. The length and the bandwidth of a signal are given by the resource elements allocated to that signal.

The resource element is the smallest unit of resources in each slot and is defined by a pair of indexes (k, l). The index $k=0, \ldots, N_{sc}-1$ indicates the subcarrier index within the system bandwidth and $l=0, \ldots, N_{symb}-1$ indicates the symbol index within the slot, where a 'symbol' refers to an OFDM symbol in downlink and a SC-FDMA (Single Carrier Frequency Division Multiple Access) symbol in uplink and $N_{sc}$ and $N_{symb}$ are the number of subcarriers and the number of symbols available in a slot.

A resource block is the smallest unit of resources allocated to a signal. A resource block is defined as $N_{symb}$ consecutive symbols in the time domain and $N_{sc}^{RB}$ consecutive subcarriers in the frequency domain, where $N_{symb}$ and $N_{sc}^{RB}$ have the values listed in Table 9. Therefore, a resource block in the uplink consists of 0.5 ms in the time domain and 180 kHz in the frequency domain. The number of resource blocks in each slot depends on the system bandwidth. Table 10 illustrates $N_{RB}$ for different bandwidths. The resource elements and resource blocks are represented in the resource grid in FIG. 15(a) for uplink (UL) and FIG. 15(b) for downlink (DL).

TABLE 9

| Configuration | $N_{sc}^{RB}$ | $N_{symb}$ |
|---|---|---|
| Normal cyclic prefix | 12 | 7 |
| Extended cyclic prefix | 12 | 6 |

TABLE 10

| System bandwidth (MHz) | 90% efficiency bandwidth (MHz) | $N_{RB}$ |
|---|---|---|
| 1.4 | 1.26 | 6 |
| 3.0 | 2.7 | 12 |
| 5 | 4.5 | 25 |
| 10 | 9 | 50 |
| 20 | 18 | 100 |

The random access channel (RACH) is the physical channel dedicated to the random access procedure for Layer 1. All uplink transmissions are initiated through the RACH. The RACH can be used for several purposes. The RACH function is different depending on the technology of the system. The RACH can be used to access the eNB 5, to request resources, to carry control information, to adjust the time offset of the uplink, or to adjust the transmitted power.

The RACH is considered contention-based because UEs 1 sending data on the RACH are not identified by the target eNB 5. Therefore, contention resolution is the major issue since many users may attempt to access the same base station simultaneously, thereby causing collisions.

The RACH occupies 6 resource blocks in a subframe or set of consecutive subframes reserved for random access preamble transmissions. The RACH period is not fixed. FIG. 16 illustrates one possible mapping of the RACH within the resource grid.

The LTE requirements for RACH are different than for UMTS. While the RACH is primarily used to register the UE 1 to the Node-B 5 after power-on in 3G systems, the LTE RACH is subject to different constraints.

The messages sent in an OFDM-based system are orthogonal. Therefore, the physical layer is designed differently. A major challenge in such a system is to maintain uplink orthogonality among UEs 1, which requires both frequency and time synchronization of the signals transmitted from the UEs.

Frequency synchronization can be achieved by fixing the transmitter local oscillator to the clock of the downlink broadcast signal. The remaining frequency misalignment at the eNB 5 is due to Doppler effects, which are neither estimated nor compensated and, therefore, require no further consideration.

However, the timing estimation has to be performed by the eNB 5 when measuring the received signal. This can be achieved during the random access procedure. The UE 1 then receives a timing advance command from the eNB 5 and adjusts its uplink transmission timing accordingly. Consequently, one purpose of the random access procedure is to obtain uplink time synchronization.

A UE 1 only has access to the slot and frame number in the downlink prior to random access. In other words, the UE 1 receives the start and the end of slots and frames from a broadcast signal but the transmission delay implies a time shift between the transmission and the reception of the broadcast signal. Therefore, the UE 1 cannot estimate when to send data such that the eNB 5 receives the data at the beginning of a slot. All the UEs 1 still must be synchronized with the cell base to avoid interference. FIG. 17 illustrates this propagation delay.

The random access procedure is the procedure by which a UE 1 obtains timing synchronization with an eNB 5. The UE 1 or the eNB 5 can initiate the random access procedure. The random access procedure is triggered by the events listed In Table 11.

TABLE 11

| Events Triggering Random Access Procedure |
|---|
| UE switches from power-off to power-on and needs to be registered to the network |
| UE transmitting and not time-synchronized with eNB (i.e. user makes a call) |
| eNB transmitting data to UE but they are not synchronized (i.e. user receives a call). |
| eNB measures delay of received signal from UE (i.e. user moving and loses synchronization) |
| UE moving from one cell to another and needs to be time-synchronized with different eNB than eNB to which it is registered (i.e. handover). |

The UE 1 selects and generates a single random access burst once the random access procedure is requested. This single random access burst is sent on the RACH with parameters derived from previous measurements on the downlink broadcast channel (BCH), such as frequency position, time period, and target power.

The random access burst consists of a cyclic prefix, a preamble, and a guard time during which nothing is transmitted as illustrated in FIG. 18. The preamble is chosen by the UE 1 from a set of signatures known by the eNB 5. A collision occurs whenever several UEs 1 choose the same signature.

The random access burst is transmitted during one subframe. A random access burst from a UE 1 that is not synchronized in the time domain can overlap with the next subframe and generate interference. Therefore, a guard time is necessary. The guard time (GT) must be at least equal to the round-trip delay at the cell edge.

For example, the maximum cell radius (R) supported by the burst of FIG. 19 is defined by the following equation, with a larger cell requiring a longer guard time:

$$R = c \cdot T_{GT}/2 \approx 15 \text{ km.}$$

Several users share the same channel during the random access procedure and are distinguishable due to orthogonal sequences. The orthogonal sequences are seen as UE 1 signatures that can be transmitted simultaneously and must satisfy criteria, such as good autocorrelation properties for accurate timing estimation of a single preamble and good cross correlation properties for accurate timing estimation of different simultaneous preambles. Zadoff-Chu (ZC) sequences are used in 3GPP to fulfill these requirements.

Each cell possesses a set of 64 signatures obtained from Zadoff-Chu (ZC) sequences. The length of one sequence is N=839 samples. A ZC sequence is defined by two integers, 'u' as the root index and 'v'?as the cyclic shift index.

The 'v-th' cyclic shift is extracted from the 'u'-th?root in the time domain according to the following equation:

$$x_{u,v}(n) = x_u(n + v \cdot N_{CS}),$$

where n=0 ... N−1 and $N_{CS}$ is the cyclic shift length.

The 'u-th' root sequence in the frequency domain is defined by the following equation:

$$X_u(n) = e^{j\pi \cdot u \cdot (n(n+1)/N)}$$

The ZC sequences have been chosen because they can generate a large number of sequences and they offer correlation properties such that the autocorrelation function shows no side peaks. The cross correlation between two sequences obtained from different roots is vN. Therefore, ZC sequences have zero-cross-correlation zones.

The random access procedure may be contention-free such that a UE 1 sends a message on the RACH without collision with the message from another UE. This may happen during handover because the eNB 5 is able to allocate a reserved signature or code to a specific UE 1. These dedicated signatures are allocated by the eNB 5 only.

FIG. 20 illustrates the sequence of messages and responses exchanged between the UE 1 and the eNB 5. The random procedure is a five-step process.

First the UE 1 retrieves information using message 1 on the BCH. The information is related to available signatures in the cell, RACH slots location and period. The UE sets its transmit power according to the signal attenuation measured in the downlink, which is open-loop power control.

The UE 1 then selects one of the available slots and sends message 2. The second message is the random access burst containing the chosen signature.

The eNB 5 then tries to detect preambles during the current RACH slot and acknowledges the successfully detected preambles in message 3. Message 3 contains a timing advance command and a power-control command and is sent on a dedicated downlink channel using the detected signature.

The UE 1 and the eNB 5 are now aligned in the time domain and the procedure ends if the procedure was contention-free. The procedure contains two more steps involving message 4 and message 5 if the procedure was not contention-free.

The UE 1 adjusts power and timing and sends a resource request message on a dedicated uplink channel if it has received an answer from the eNB 5. The UE 1 requests bandwidth and time resources in order to transmit data and also indicates a UE-specific identifier in message 4.

The UE 1 waits for the next RACH slot to send another preamble if no response corresponding to the transmitted preamble sequence is received. The procedure is terminated after a certain number of failures. The timing-advance command instructs the UE 1 to correct its transmission timing by a multiple of 0.52 ms, which is referred to as granularity.

The eNB 5 then resolves contentions. Either the UE 1 was in collision and message 5 provides the command to re-start the procedure or the UE was not in collision and the message 5 is a resource assignment with the next transmissions performed as usual.

The detailed random access procedure in the UE 1 procedure will now be described. The UE 1 listens to a downlink broadcast signal to receive information related to the available signatures, frequency bands, time slots, and power settings for a random access.

Open-loop power control can be used to obtain a suitable transmission power. The UE 1 estimates path loss from a downlink reference signal and sets the transmission power to achieve a signal-to-noise ratio (SNR) target indicated by the eNB 5.

The eNB 5 may fix the targeted SNR upon the measured level of uplink interference. The shadowing in the uplink path may differ from the shadowing in the downlink path because the carrier frequency has changed.

The UE 1 randomly selects a signature, a time slot and a frequency band from the available set. The UE 1 then sends a burst containing the chosen signature over the selected RACH slot.

The UE 1 decodes a received positive response and adapts its transmission timing. The UE 1 also adapts its transmission power if the response contains power control information. The UE 1 may request resources and use a specific identifier (ID) in the message to resolve contentions.

The UE 1 then monitors a specified downlink channel for a response from the eNB 5. The next transmissions are performed normally if a positive resource grant is received. The UE 1 restarts the random access procedure if a collision indicator is received or no response is received from the eNB 5.

A new random access attempt is performed in the next available RACH slot if the UE 1 does not receive a response from the eNB 5. The UE 1 should keep the same signature and the transmission power may be increased using a power ramping method.

The detailed random access procedure in the eNB 5 will now be described. The eNB 5 updates the information transmitted on the BCH periodically.

The eNB 5 monitors the RACH slot in expectation of random accesses. The eNB 5 correlates the received signal in the RACH sub-frame with all possible signatures. The detection can be performed either in the time domain or in the frequency domain using a process that will be described later.

A detection variable is computed for each signature. The signal is considered detected if the detection variable exceeds a certain threshold.

The timing offset is then computed from the peak position. The eNB 5 could also estimate a power adjustment from the values of the detection variables.

The eNB 5 sends a response using the detected signature. This acknowledgement is sent over dedicated resources.

The eNB 5 determines how many UEs 1 were detected with the same signature and resolves the possible contentions if a resource request with a UE-specific ID is received. The eNB 5 also identifies the UE 1 and assigns resources according to scheduling rules.

The UE 1 waits for the next RACH slot to re-send the preamble if a preamble is not detected in the first attempt. The preamble signal-to-noise ratio (SNR) is relatively low compared to the data SNR due to the length of the zero-correlation sequences. The UEs 1 can increase the transmit power by a few decibels (dB) for the second attempt in order to prevent consecutive failures since the random access channel does not generate much interference. A long delay is not desirable, especially for handover.

DISCLOSURE

Technical Problem

One reason for not detecting a preamble in the first try may be severe channel attenuation. The channel is likely to be fading again if the next RACH slot occupies the same position in the frequency domain.

One way to take advantage of frequency diversity is to hop the frequency position of the RACH from one slot to another according to a hopping pattern. FIG. 21 illustrates a frequency hopping pattern. However, this process requires more broadcast information overhead and introduces delay when performing handover.

The MAC layer primarily handles the random access procedure for LTE. Therefore, LTE does not require three counters for counting preamble transmissions in the physical layer, counting power ramping attempts in MAC layer and counting "RACH procedures" in RRC layer.

Technical Solution

In one aspect of the present invention, a method of performing a random access procedure in a wireless communication system is provided. The method includes receiving random access information through a broadcast channel, the random access information including at least random access signature information, a power ramping parameter and an access slot configuration parameter, initiating a random access procedure according to a cause parameter, the cause parameter corresponding to a condition requiring a new random access before each preamble transmission, selecting a signature for use in the preamble, the signature based on the random access signature information, determining an access slot for transmission of the signature on a random access channel, the access slot based on the access slot configuration parameter, determining transmission power for transmission of the signature and transmitting the preamble including the signature using the access slot.

It is contemplated that the method further includes performing delay control prior to transmitting the preamble in order to reduce conflicts by multiple mobile terminals using the random access channel. It is further contemplated that the delay control is based on at least a number of preamble re-transmission, a random access channel load or a priority scheme of a mobile terminal.

It is contemplated that the delay control is performed only when re-transmitting the preamble. It is further contemplated that the method further includes attempting re-transmission of the preamble for a predetermine time or until a receipt acknowledgement is received.

It is contemplated that the predetermined time includes a maximum number of retransmissions based on a priority connection level of a mobile terminal. It is further contemplated that the method further includes no longer attempting re-transmission if access is no longer necessary or upon interruption of the random access procedure.

It is contemplated that determining the access slot includes selecting a random access slot offset in frequency or time in each successive transmission of the preamble. It is further contemplated that the condition to which the cause parameter corresponds is at least initial access of a base station, handover or losing synchronization.

It is contemplated that the transmission power is determined based on at least open loop power control, number of preamble retransmission or frequency of the determined access slot. It is further contemplated the method further includes increasing the transmission power according to the power ramping parameter in each hopping cycle if it is determined that power ramping is necessary.

In another aspect of the present invention, a mobile terminal for performing a random access procedure in a wireless communication system is provided The mobile terminal includes a transmitting unit for transmitting signals, a receiving unit receiving random access information through a broadcast channel, the random access information including at least random access signature information, a power ramping parameter or an access slot configuration parameter, a display unit displaying information, an input unit receiving inputs from a user and a processing unit initiating a random access procedure according to a cause parameter, selecting a signature for use in the preamble, determining an access slot for transmission of the signature on a random access channel, determining transmission power for transmission of the signature, and controlling the transmitting unit to transmit the preamble including the signature using the access slot, wherein the cause parameter corresponds to a condition requiring a new random access before each preamble transmission, the signature is based on the random access signature information, and the access slot is based on the access slot configuration parameter.

It is contemplated that the processing unit further performs delay control prior to transmitting the preamble in order to reduce conflicts by multiple mobile terminals using the random access channel. It is further contemplated that the processing unit performs the delay control based on at least a number of preamble re-transmission, a random access channel load or a priority scheme of a mobile terminal.

It is contemplated that the processing unit performs the delay control only when re-transmitting the preamble. It is further contemplated that the processing unit further attempts re-transmission of the preamble for, a predetermine time or until a receipt acknowledgement is received.

It is contemplated that the predetermined time includes a maximum number of retransmissions based on a priority connection level of a mobile terminal. It is further contemplated that the processing unit no longer attempts re-transmission if access is no longer necessary or upon interruption of the random access procedure.

It is contemplated that the processing unit determines the access slot by selecting a random access slot offset in frequency or time in each successive transmission of the preamble. It is further contemplated that the condition to which the cause parameter corresponds is at least initial access of a base station, handover or losing synchronization.

It is contemplated that the processing unit determines transmission power based on at least open loop power control, number of preamble retransmission or frequency of the determined access slot. It is further contemplated that the processing unit increases the transmission power according to the power ramping parameter in each hopping cycle if it is determined that power ramping is necessary.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

Advantageous Effects

The present invention proposes to model one cycle in the random access procedure since only one counter is necessary and there is no longer a need for three counters in LTE. The present invention further proposes to use soft combining for RACH that provides similar gain to frequency hopping in the detection of the RACH preamble retransmission, a process that is very useful for the bandwidth where frequency hopping of RACH is not possible.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

FIG. 23 illustrates fixed pattern resource allocation.

FIG. 24 illustrates time dependent resource allocation.

BEST MODE

Reference will now be made in detail to the preferred embodiments of the present invention, examples of which are illustrated in the accompanying drawings. The present invention proposes to model one cycle in the random access procedure since only one counter is necessary and there is no longer a need for three counters in LTE. The present invention further proposes to use soft combining for RACH that provides similar gain to frequency hopping in the detection of the RACH preamble retransmission, a process that is very useful for the bandwidth where frequency hopping of RACH is not possible.

Figure 22:
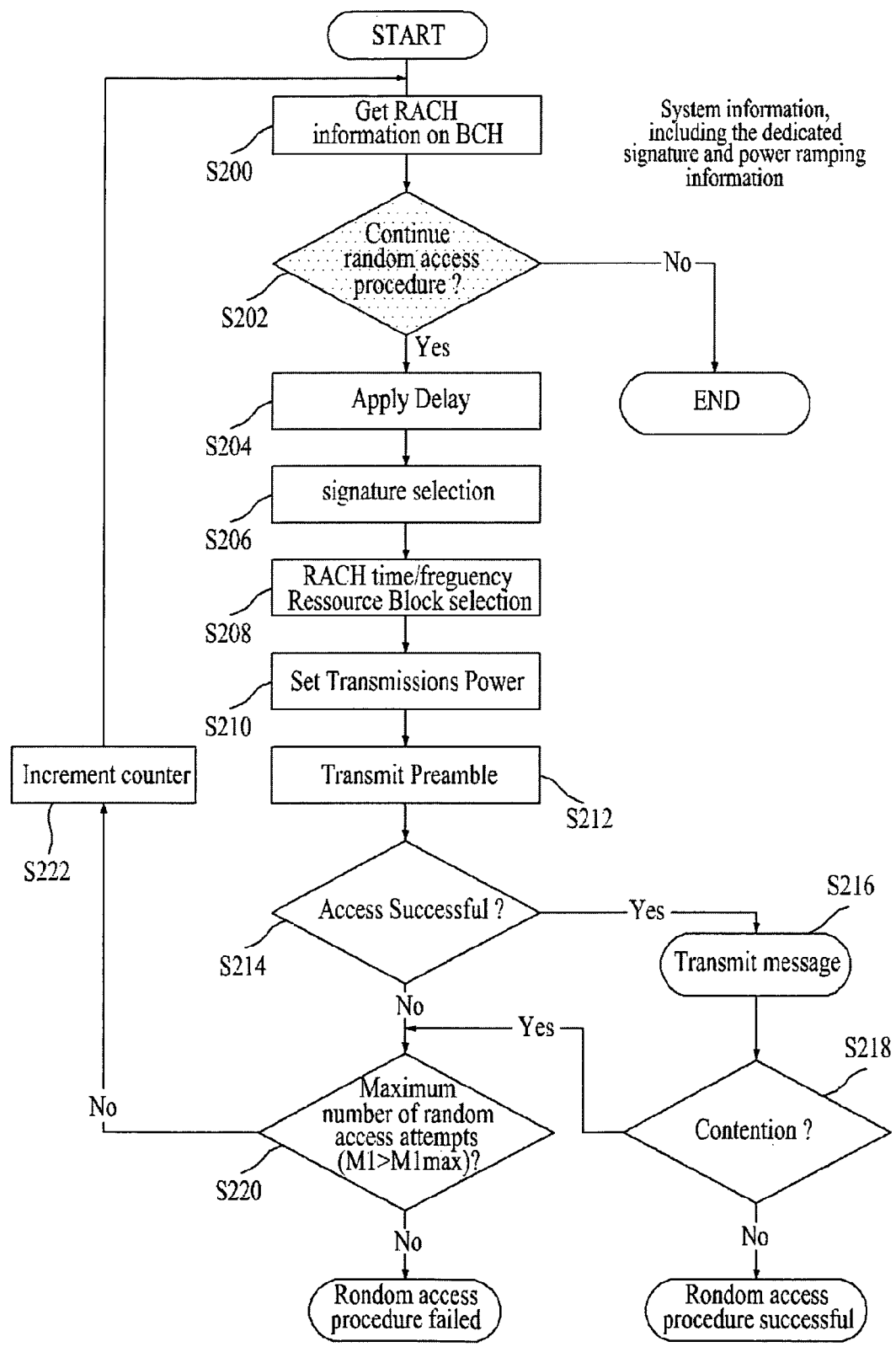
FIG. 22 illustrates a random access procedure for LTE a according to the present invention.

FIG. 22 illustrates the proposed random access procedure in LTE according to the present invention. As illustrated in FIG. 22, the UE 1 retrieves RACH information on the BCH (S200). The retrieved information may be related to available signatures for random access or power ramping information.

It is possible that more than one RACH attempt may be necessary or the contents of the message to be transmitted changes since the power ramping can be performed for some time due to several failed attempts to transmit the preamble. Therefore, it is necessary to check, either before each transmission or on a regular basis, whether the random access procedure should continue (S202).

The random access procedure may not be continued, for example, if transmission of the current message is no longer necessary. The random access procedure may also be interrupted, such as when the UE 1 has to access RACH for a new reason with different priority, for example in order to make a call.

A delay is applied according to the value of a counter M1 (S204) it is determined that the random access procedure should continue. The determination of the delay is similar to the persistency test in UMTS and is intended to control congestion. Calculation of the delay is discussed later.

The UE 1 selects a signature (S206). The UE 1 can randomly select a signature from the available signatures, for example, before the first preamble transmission. The UE 1 may also keep the same signature between two successive transmissions. The choice of the signature may depend on the size of the message to be transmitted in the uplink, the requested resource blocks or the counter M1, which is discussed later.

A slot is then chosen for the transmission of the signature on the PRACH channel by selecting a time/frequency resource block (S208). The choice of the access slot depends on the chosen method of frequency hopping. For example, the PRACH access slot may be chosen randomly for a random hopping pattern. The choice of access slot may depend on different parameters and different alternatives for the choice of the access slot are discussed later.

The transmission power is then set (S210). The transmission power may be chosen by the UE 1 according to the counter M1 value, since transmission power may be a function of M1, and according to an open loop power control, such as measurements that are performed on reference signals received from the cell on which the RACH access is performed. Calculation of the transmission power is discussed later.

The UE 1 then transmits a preamble (S212). The UE 1 determines if access was successful after the preamble is transmitted (S214).

The UE 1 transmits the message part if the access was successful (S216). Contention resolution is the performed (S218), for example by waiting until message 4 to determine if the random access procedure was successful or if contention occurred.

The random access procedure is successful if there is no contention. A determination is made of whether the maximum number of random access attempts has been reached if the preamble access was not successful or contention occurred (S220).

The random access procedure is considered unsuccessful if contention occurs or the maximum number of random access attempts has been reached and the unsuccessful procedure is signaled to a higher layer, such as the RRC, if the UE 1 was in the RRC connected mode or the UE transitions to IDLE mode if the UE was not in RRC connected mode. The counter M1 is incremented and a new random access attempt is made if the maximum number of random access attempts has not been reached (S222).

The sequence of the steps in FIG. 22 is only exemplary and the various steps may be performed in different sequence without altering the intent of the present invention. For example, the delay may be applied (S204) after selection of the signature (S206), selection of the time/frequency resource block (S208) and setting of transmission power (S210).

The choice of the resources to use for the random access procedure, such as time/frequency, is not well defined for LTE. The present invention proposes a way to define the available resource for random access in the whole LTE bandwidth available for RACH and a way for the UE 1 to choose the access slot, which is one resource, when several resources are available at a given time.

The present invention also proposes to introduce frequency hopping in LTE. A UE 1 utilizing frequency hopping would change the access slot between two RACH attempts and can experience better radio conditions on the new resources. The probability that the preamble sent by the UE1 is detected can be increased by using frequency hopping on RACH, specifically when radio quality is bad or there is too much interference on a specific resource, such as tone and time slot or a resource block in 3GPP.

Frequency hopping can use different hopping patterns, specifically random pattern, fixed pattern and flexible pattern. There are two dimensions in frequency hopping, specifically hopping of the available resources and choice of the resource for use when resources are available for the transmission of the signature.

The following examples of the different hopping patterns assume 3 slots for RACH and a 10 MHz bandwidth, with a 1.25 MHz bandwidth for each RACH slot. However, the same principles apply for different frequencies and lengths of RACH procedures. Information about the available access slots dedicated for RACH at a certain time would be broadcast on the BCH with the other random access information.

There are different alternatives for the allocation of time/frequency resources by the eNB 5. Resources may be allocated according to fixed pattern resource allocation or according to time dependent resource allocation.

FIG. 23 illustrates two examples of fixed pattern resource allocation. As illustrated in FIG. 23, slots 1, 2 and 3 are used for the RACH and the RACH repetition occurs every 10 ms for a 10 ms transmission time interval (TTI).

The frequency resources allocated for RACH are fixed for fixed pattern resource allocation. The fixed pattern scheme can be configured either by system information or dedicated messages, with the number of resources and the periodicity of the resources or a ratio of the resources compared to the available bandwidth signaled to the UE 1. On the other hand, the resources may be fixed in a standard possibly depending on the total bandwidth available.

Conventional methods use only one resource block per transmission time interval (TTI). Furthermore, present LTE methods do not allow frequency hopping with the same frequency always used.

The best suited pattern would be one where the frequency gap between the RACH slot is maximized from one transmission to another due to the fact that a neighbor slot has more chance to have the same interference than a slot that is further away. The BCH or dedicated signatures are possible ways to transmit information about the pattern.

One advantage of the fixed pattern resource allocation scheme is the UE 1 retrieves information about the available resources and about the hopping scheme for use on the system information at the same time that other information on RACH is retrieved. On the other hand, a UE 1 has to receive the system frame number (SFN) first in a time dependent resource allocation scheme. Another possible gain of using a fixed pattern resource allocation scheme is related to signature selection and will be discussed later. The drawback of the fixed pattern resource allocation scheme is that there will not be any frequency change between two random access attempts if there is only one resource available or, in other words, no frequency hopping.

The information about the available resources could also be signaled to the UE 1 via dedicated signaling. For example, the cell on which the UE 1 is camping could signal the information of a neighboring cell that the UE will access.

FIG. 24 illustrates time dependent resource allocation. Time dependent resource allocation is a scheme in which the UE 1 determines the available RACH access slot based on a parameter such as SFN.

As illustrated in FIG. 24, the access slots reserved for RACH are not necessarily always at the same time and can be allocated at different frequencies depending on the time. The slot used for RACH would be chosen depending on the SFN. Therefore the UE 1 has to receive the SFN first and then can determine which resources are available after reception of the SFN.

The determination would typically depend on the number of resources that can be used for the RACH. This facilitates frequency hopping even if only one resource is available in each time slot.

One way to choose the resources for random access from the available bandwidth is based on the SFN. For example, the first available resource is taken if SFN modulo 3=1 and the second available resource is taken if SFN modulo 3=2.

This example is also applicable if there is more than one resource available according to the number of available resources. For example, take the first 3 resources, then the last 3 resources, then the third, fourth and fifth resources if eight resources are free on the whole bandwidth.

FIG. 24 illustrates a hopping cycle based on three time slots or modulo-3. However, the cycle length can be fixed using a modulo other than 3.

The hopping pattern can be chosen according to the number of resources available for random access. For example, a flexible scheme would be preferable if there are few resources available.

Figure 25:
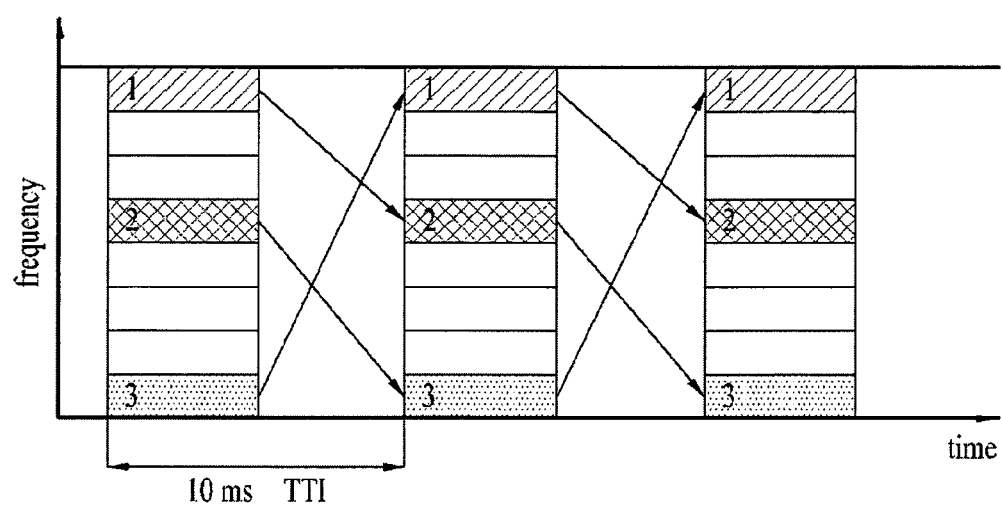
FIG. 25 illustrates fixed resource selection applied to a fixed resource pattern.
Figure 26:
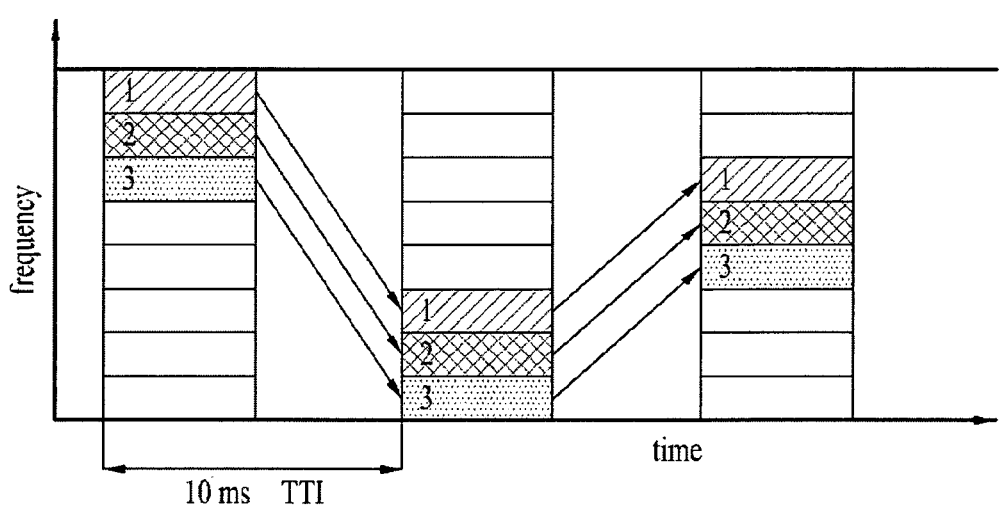
FIG. 26 illustrates fixed resource selection applied to a time dependent resource allocation.
Figure 27:
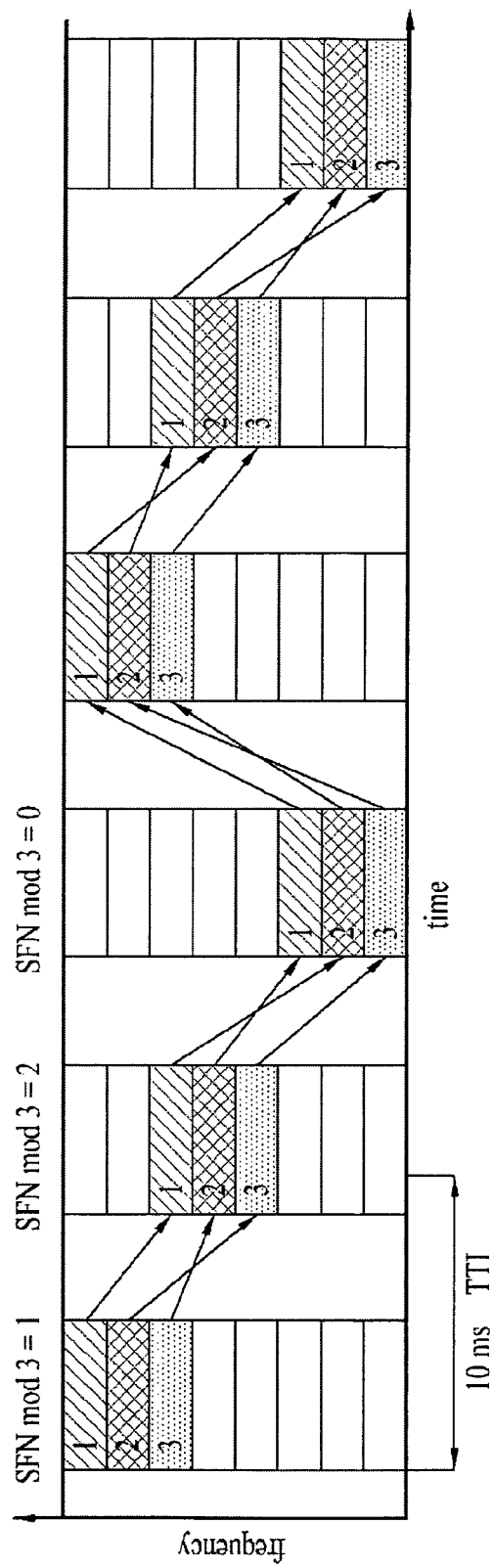
FIG. 27 illustrates time dependent resource selection applied to a time dependent resource allocation.

One of the available resources must be selected once the UE 1 has determined the available resources. FIGS. 25-27 illustrate examples of RACH time/frequency resource block selection (S208). FIGS. 25 and 26 illustrate selection of resources for a fixed pattern selection scheme. FIG. 27 illustrates selection of resources for a time dependent selection scheme.

FIG. 25 illustrates a fixed resource selection pattern applied to a fixed resource pattern. As illustrated in FIG. 25, the three resources are numbered from 1 to 3 as shown by the arrows and repeating patterns can be defined. FIG. 25 illustrates three cyclic patterns defined as 1-2-3, 2-3-1 and 3-1-2.

The UE 1 only has to know one pattern in order to determine all other patterns by applying a cyclic shift because each of these three patterns can be created though a cyclic shift of any of the other patterns. Therefore, the UE 1 selects the pattern only for the first transmission and will follow the sequence of the pattern for subsequent transmissions.

Another set of patterns might be 1-1-1, 2-2-2 and 3-3-3 applied to a time dependent resource allocation scheme as illustrated in FIG. 26. Resource selection for the first access may be performed based on a random choice among the available resources.

FIG. 27 illustrates a time dependent resource selection pattern applied to a time dependent resource allocation. As illustrated in FIG. 27, the choice of the first transmission also depends on the time.

For example, the pattern is 1(e)-1(o)-2(e)-3(o)-3(e)-2(o), 2(e)-3(o)-3(e)-2(o)-1(e)-1(o) and 3(e)-2(o)-1(e)-1(o)-2(e)-3 (o) with even SFN. Each pattern can be generated by cyclic shifts of 2.

The UE 1 has to first determine the SFN and check whether the SFN is even (e) or odd (u). Then the UE 1 can determine the sequence.

A random pattern scheme allows the frequency slot used by the UE 1 for the RACH access to be selected randomly from the available resources for random access. This selection is independent of the pattern chosen for resource selection.

Signature selection (S206) is dependent upon whether a dedicated signature is allocated to the UE 1. Various issues must be addressed for allocation of a dedicated signature and for use of soft combining.

A dedicated signature should be allocated to the UE 1 in three situations, specifically handover, downlink transfer during out of sync and discontinuous reception (DRX). Three issues must be determined for each of the three situations, specifically which eNB 5 allocates the preamble such as the target eNB for handover, the period for which the dedicated signature is valid, and the number of preambles that can be reserved for dedicated use.

Soft combining may be used for the LTE random access procedure. A soft combining technique can be used at the eNB 5 as long as there is either no change in the signature used each time the UE 1 tries to access RACH or if signature selection is according to a predictable method such as a fixed pattern. This does not change the probability of collision.

Soft combining adds samples received during the current RACH slot to samples received during previous RACH slots at the receiver side before the energy detection. The combining of the samples causes destructive interference for the noise samples whereas the signal samples are combined coherently. A UE 1 is more likely to be detected at its second transmission when soft combining is used because the signal-to-noise ratio is higher.

Figure 28:
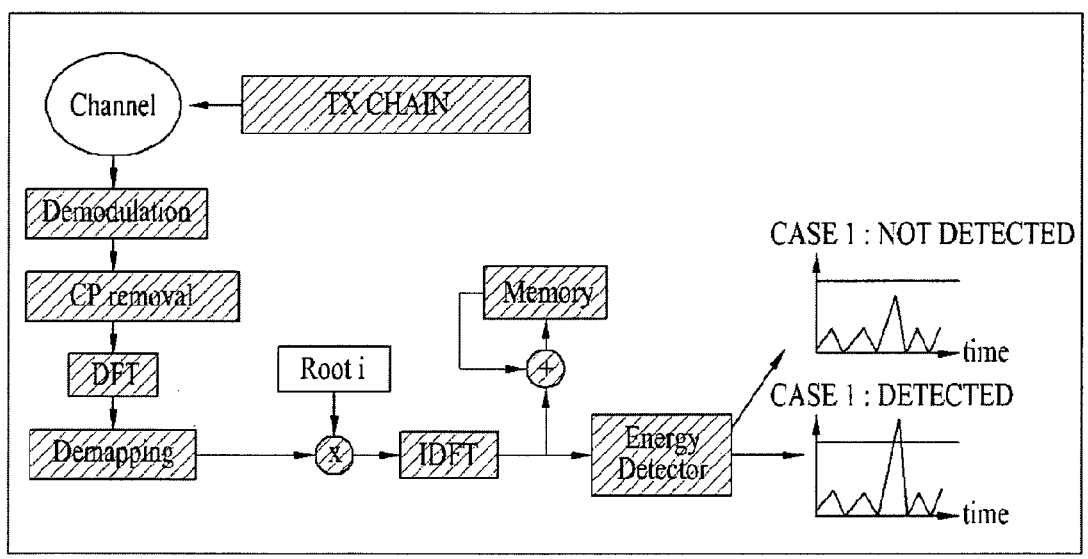
FIG. 28 illustrates the principle of soft combining.

FIG. 28 illustrates the principle of soft combining. A memory is used between the IFFT (Inverse Fast Fourier Transformation) and the energy detector. The sum of the current and the previous samples is kept in the memory. The output of the IFFT is applied to the energy detector. The preamble transmission is successful if a preamble is detected. The energy detector is applied to the samples saved in the memory if no preamble is detected.

Figure 29:
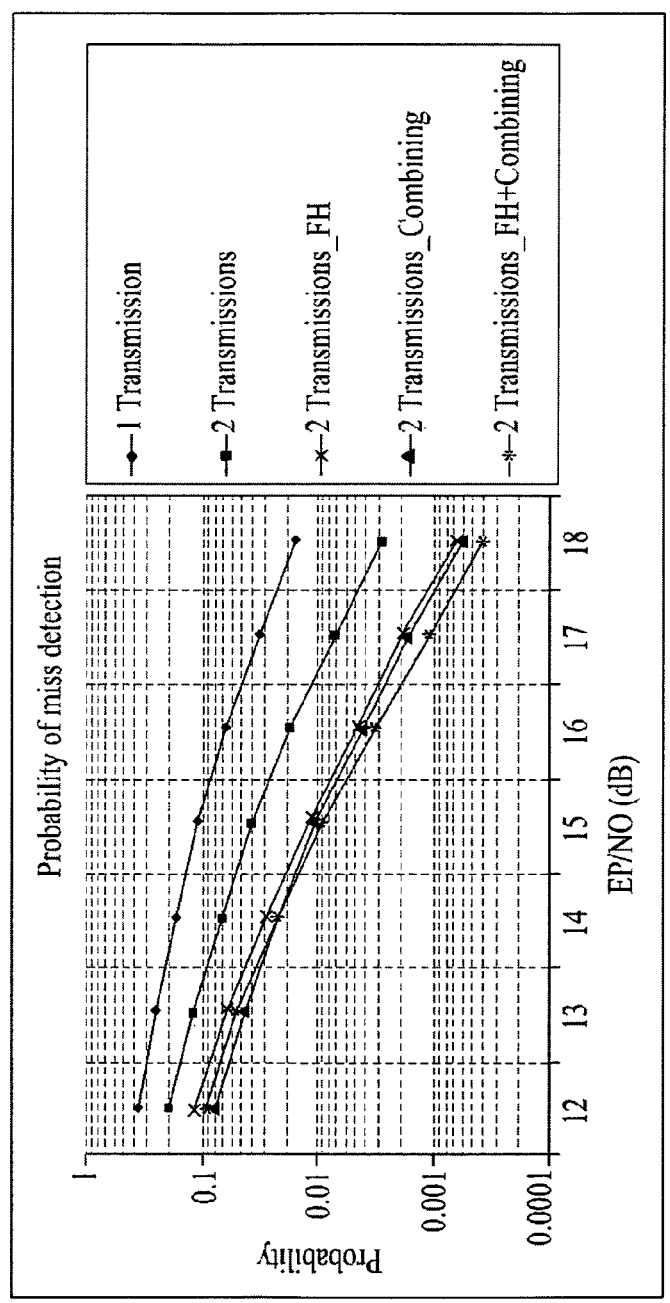
FIG. 29 illustrates the gain of soft combining at the second preamble transmission.

FIG. 29 illustrates the gain of frequency hopping and soft combining on the second preamble transmission. As can be seen in FIG. 29, the gain of soft combining is similar or slightly better than the gain of frequency hopping. The use of soft combining can avoid having to change the frequency at each RACH transmission and, therefore, make handover operation simpler because there is no need to read the SFN to detect in which frequency the preamble should be transmitted.

A soft combining technique allows the eNB 5 to detect a UE 1 that cannot otherwise be detected, such as when the eNB receives a preamble with a power below the threshold. Soft combining may be used with a fixed signature selection pattern that is either dependent or independent on the SFN and for both a fixed or time dependant resources allocation.

Figure 30:
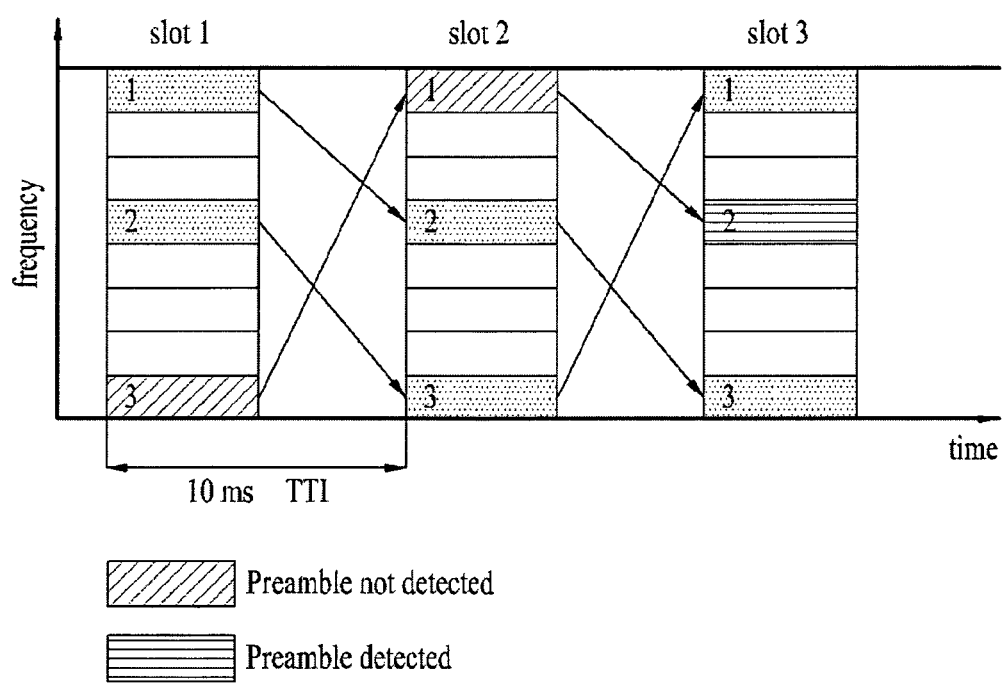
FIG. 30 illustrates use of soft combining with a fixed hopping pattern.

FIG. 30 illustrates soft combining with a fixed frequency hopping pattern. As illustrated in FIG. 30, the UE 1 transmits a preamble on the RACH during slot 1 using time frequency resource 3, but the eNB 5 receives the preamble at a power below the threshold. Therefore, the UE 1 is not detected.

As further illustrated in FIG. 30, the UE 1 again tries to access RACH by sending a preamble during slot 2. Whether the UE 1 sends the same preamble or another preamble depends on the way that the next preamble is determined. The UE 1 uses time frequency resource 1 due to frequency hopping. The eNB 5 receives the preamble with a power that is still below the threshold. Therefore, the UE 1 is still not detected.

As further illustrated in FIG. 30, the UE 1 again tries to access RACH by sending a preamble during slot 3. Whether the UE 1 sends the same preamble or another preamble depends on the way that the next preamble is determined. The UE 1 uses time frequency resource 2 due to frequency hopping. The eNB 5 receives the preamble at a power at or above the threshold. Therefore, the UE 1 is detected.

The eNB 5 can soft combine the received energy for the preamble sent in slot 1 using resource 3 with the received energy of preamble sent in slot 2 using resource 1 and the received energy of the preamble sent in slot 3 using resource 2 in order to increase the probability of detection. Soft combining allows the eNB 5 to deduce that a preamble received below the power threshold is a UE 1 performing random access rather than an error and continue the random access procedure with the UE. Therefore, the probability that a UE 1 is detected after several retransmissions is increased.

The eNB 5 should not perform soft combining if a signature transmission has been detected in the previous slot for a given resource and preamble in order to reduce the probability of false detection. The eNB 5 can indicate that the UE 1 should increase its transmission power if the preamble sent in slot 3 is not detected.

Soft combining requires that the delay between each transmission be fixed. Therefore, this is a consideration when the delay is applied (S204).

The present invention proposes that the UE 1 make several attempts to transmit a preamble without changing the signature as in UMTS. Signature selection (S204) in LTE would be performed for certain values of the counter M1 by randomly choosing a signature from the groups of available signatures. For example, a signature may be chosen randomly for the first attempt and then a new signature is chosen randomly when the counter M1 modulo 5=0.

The transmission power of the random access preamble is based on two factors in UMTS. The first factor is open loop power control. The second factor is the number of retransmissions in the ramping cycle such that the power is increased by a fixed ramping step after each preamble transmission attempt, the ramping step broadcast on the BCH with other information for random access.

The present invention proposes using three factors to control the preamble transmission power (S210) for LTE. The first factor is open loop power control. The second factor is the number of preamble retransmissions after the last open loop power control. The third factor is the frequency of the resource block or, specifically, whether a preamble was already transmitted on a resource block or the last transmission power on that frequency.

One proposal is to calculate the transmission power for the first transmission with the open loop power control and maintaining the transmission power between two preamble transmissions while changing the chosen PRACH access slot such that a different frequency/time is used, for example according to a frequency hopping pattern. The same transmission power is used during an access slot hopping cycle.

A new transmission power is set using a ramping step or other algorithm to increase/decrease power when the hopping pattern cycle starts again, such as during the frequency hopping pattern cycle. The UE 1 applies the same transmission power and does not apply a new transmission power until the following equation is satisfied:

$$M1 \bmod(H\max)=0, \text{ where:}$$

M1 is the count of access attempts and

Hmax is the number of hopping access slots with the same transmission power.

Several mechanisms are used in UMTS to reduce congestion, such as persistency, MAC delay or back-off, and an RRC delay procedure. Congestion control for LTE is still needed and the concept of persistency and back-off might be utilized.

The present invention proposes to merge persistency and back-off into a single applied delay (S204). Several factors are proposed for calculating this delay.

A first factor for calculating the single delay is the number of preamble transmissions the UE 1 has performed or the value of the counter M1. Using the value of the counter M1 as the principal parameter would allow the application of a mechanism similar to persistency for certain values of the counter M1 and mechanisms similar to back-off for other values of the counter M1.

A second factor for calculating the single delay is the load of RACH channel or the number of UE 1 performing a random access procedure at the same time. A third factor for calculating the single delay is any priority scheme that could be introduced in LTE, such as access class or other UE 1 priority scheme.

The present invention proposes modifying the persistency principle for LTE. Specifically, the persistency value should be a random value with a factor added such that the application of persistency is optimized.

Adding a factor to the persistency value is a concept not defined in UMTS that allows a UE 1 that has a higher number of unsuccessful preamble transmissions to get a lower persistency value, which results in a lower average delay. The initial persistency value can depend on the access service class if defined for LTE.

The optimization of the random access procedure persistency concept is to apply the persistency only from the second physical random access attempt, except in two specific situations for which a persistency value is also applied for the first attempt in order to avoid overload. The use of persistency at the first attempt or first transmission is not necessary for all the other cases when the UE makes preamble transmissions.

However, there is a risk that a large number of UE 1 will make a RACH attempt by trying to transmit a preamble in order to perform a tracking area (TA) update and counting MBMS. Therefore, persistency is applied for the first attempt in those two situations in order to avoid collisions as much as possible.

Applying the UMTS RACH back-off to LTE results in a delay attributed to a UE 1 that has made unsuccessful attempts to access the RACH up to a maximum number of attempts. The UE 1 would then have to wait until the delay is over before trying to again access the RACH.

The present invention proposes to consider several parameters regarding the back-off. Specifically, the parameters for consideration are the back-off time, how to inform a UE 1 of the back-off time, the power lever used after the back-off and the signature used after back-off.

Back-off time is the delay before the UE 1 may attempt to access the RACH again. This delay could be random or fixed. This delay may depend on the UE 1 access service class or the number of RACH attempts for a specific UE.

The back-off time can be indicated in message 2 or derived from the number of NACK responses in the received message 2 if the UE 1 receives a NACK in message 2. For example, the UE 1 assumes there will be many back-off delays from other UEs at the same time if message 2 contains many NACK. Therefore, the UE 1 can choose an access slot randomly within a longer time span, such as 100 ms.

The back-off time can be indicated on the dynamic BCH if the back-off time is not fixed. A specific back off time for a specific UE 1 eventually can be derived from this value by taking into account parameters such as ASC and number of RACH attempts.

The back-off parameters can also be indicated in message 2 if NACK is sent by the eNB 5 in message 2. The UE 1 can retrieve information such as back-off time and re-direction information from message 2 if a NACK is sent in message 2.

It may not be necessary for a UE 1 to start a new RACH procedure after back-off with a different power than the power calculated with the open loop power control since the interferences and radio conditions will have changed. Therefore, the UE 1 may use the same power after the back-off that it used at the first RACH attempt.

On the other hand, the unsuccessful RACH access may be due to two problems, specifically too much interference and a transmit power that was too low. Therefore, the transmission power after back may be set to a higher value than was calculated with the open loop power control in order to allow the UE 1 to access RACH more quickly. The transmission power increase may be calculated using the last power step that was used for the previous RACH access.

There are two alternatives for selecting the signature after back-off. One alternative is to keep the same signature as before the back-off. The other alternative is to randomly choose another signature from the set of available signatures.

The best alternative seems to be randomly selecting another signature since a collision can occur if two UEs 1 pick the same signature and use the same RACH access slot. Randomly choosing a new signature after back-off would reduce the probability that a new collision occurs between two UEs 1.

There is a need to prioritize some random accesses, such as for emergency service. Access classes (AC) is a prioritization scheme starting in message 3. However, some random accesses may need to be prioritized as soon as message 1. There are two alternatives to introduce priority in random access for LTE.

One alternative is to dedicate a set of signatures for each AC. However this alternative has several disadvantages. One disadvantage is a need to broadcast additional information on the BCH about the available signatures for each AC, which implies fragmenting the resources and may lead to earlier congestion if a high number of UEs 1 from a specific AC attempt access.

Figure 1:
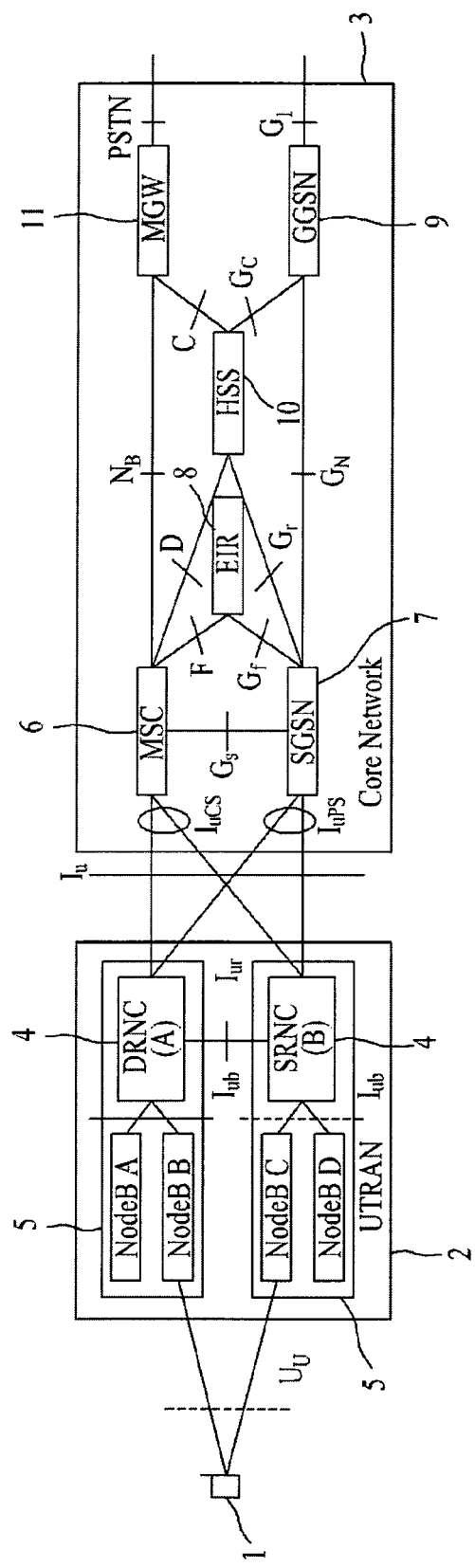
FIG. 1 illustrates an overview of a UMTS network.
Figure 2:
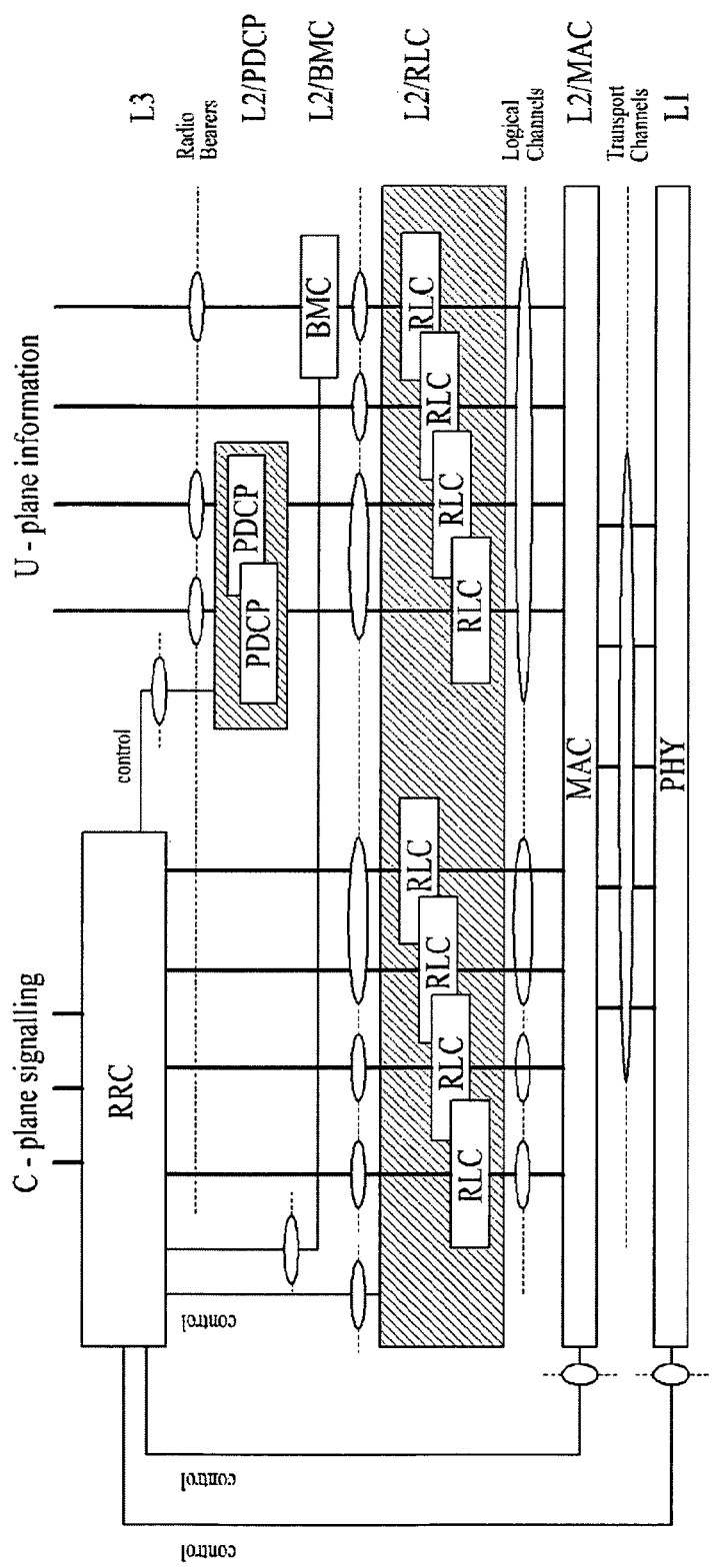
FIG. 2 illustrates a structure of a radio interface protocol between a UE and the UTRAN according to the 3GPP radio access network standards.
Figure 3:
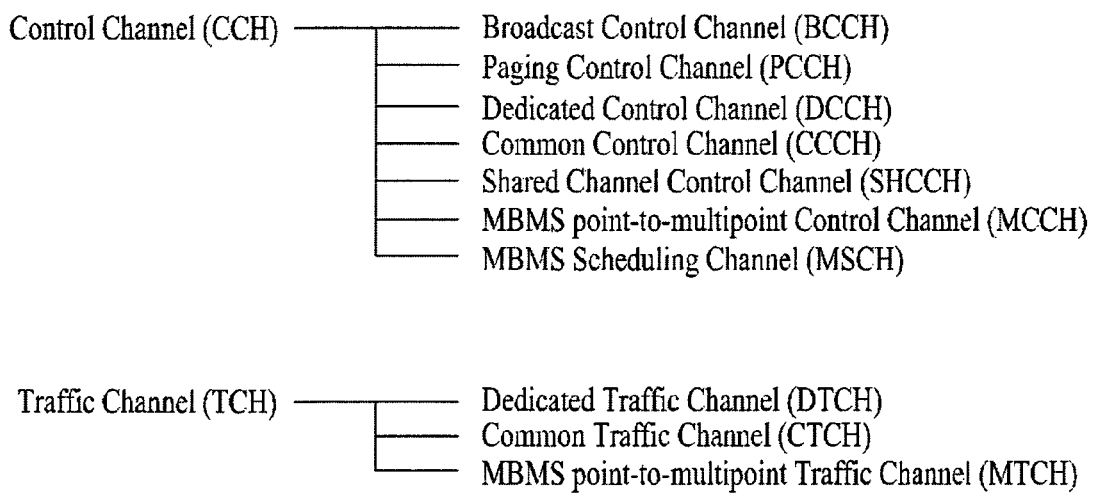
FIG. 3 illustrates the different logical channels.
Figure 4:
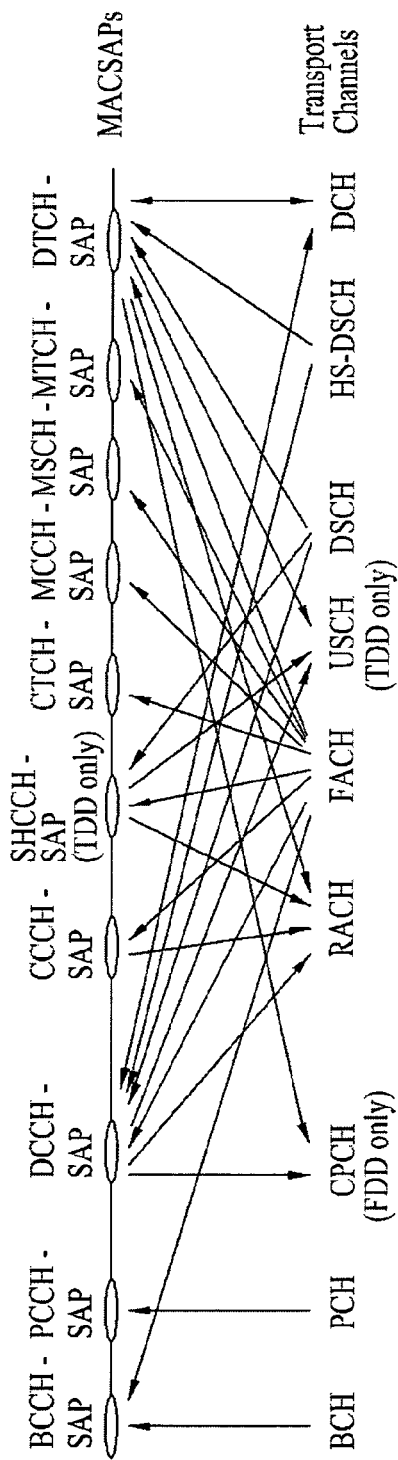
FIG. 4 illustrates logical channels mapped onto transport channels as seen from the UE side.
Figure 5:
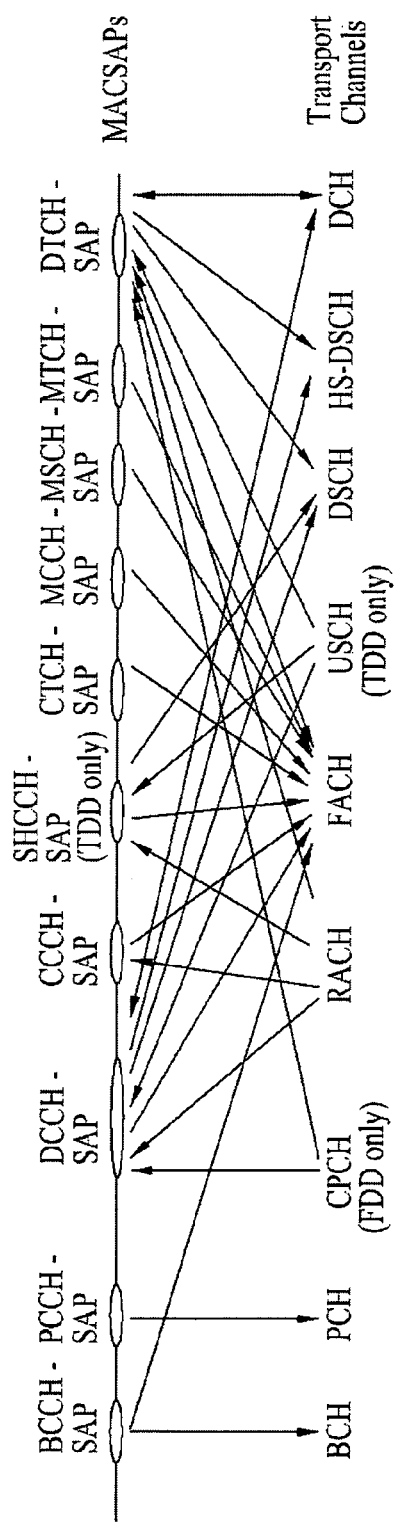
FIG. 5 illustrates logical channels mapped onto transport channels as seen from the UTRAN side.
Figure 6:
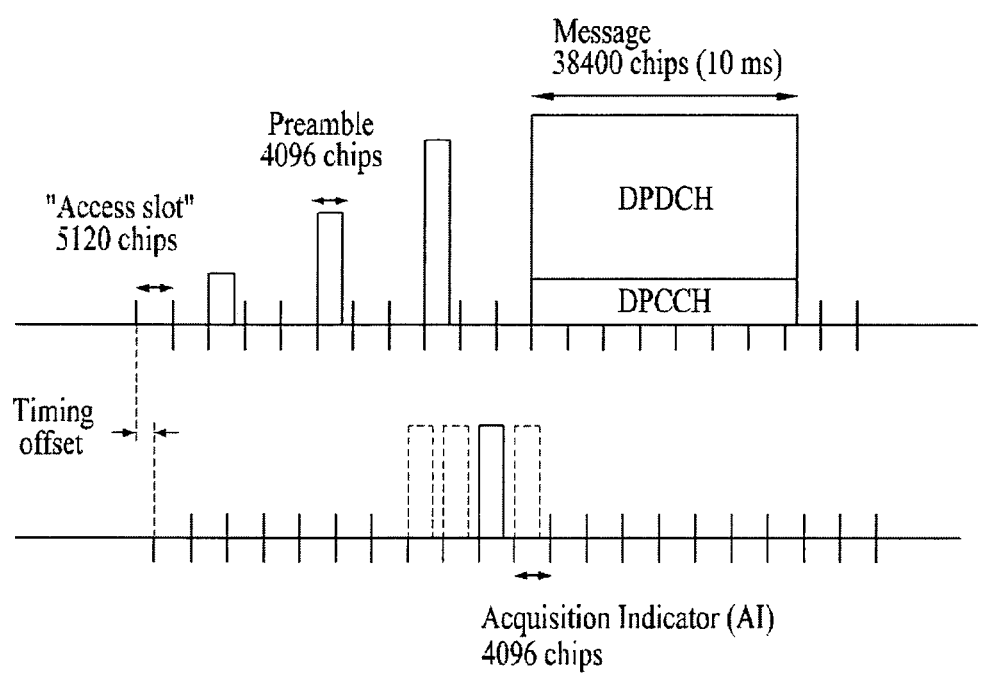
FIG. 6 illustrates a power ramping procedure.
Figure 7:
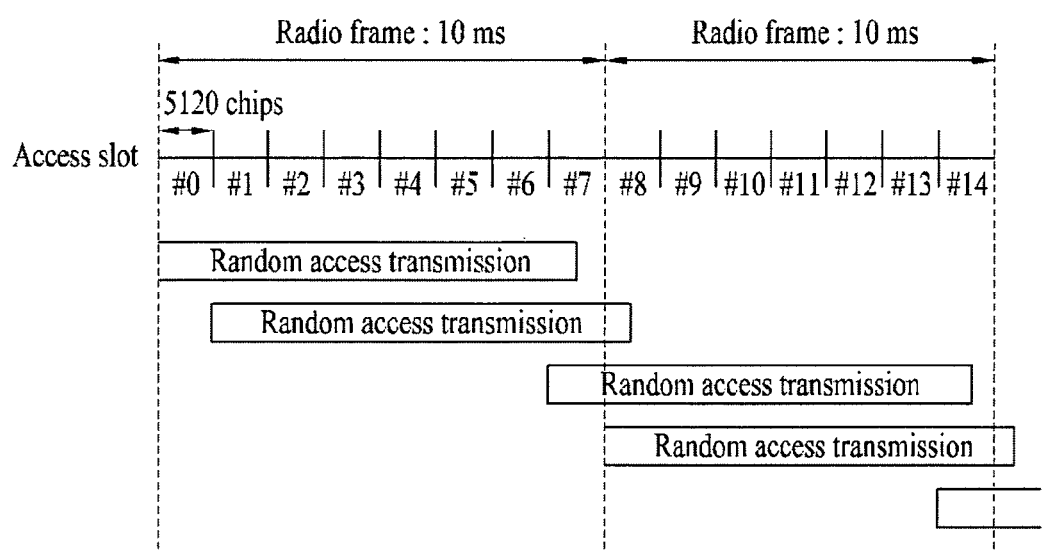
FIG. 7 illustrates the number and spacing of access slots.
Figure 8:
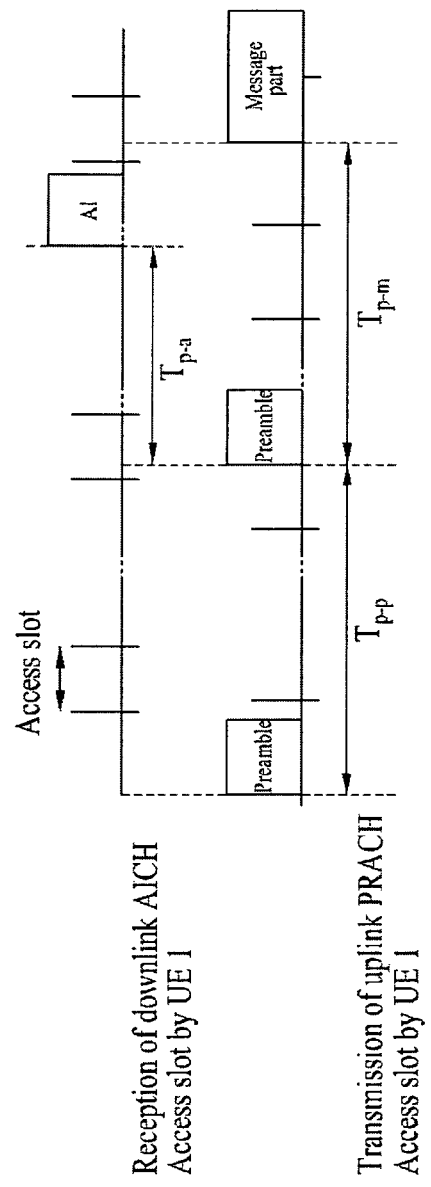
FIG. 8 illustrates the timing of the preamble, Access Indicator and message part.
Figure 9:
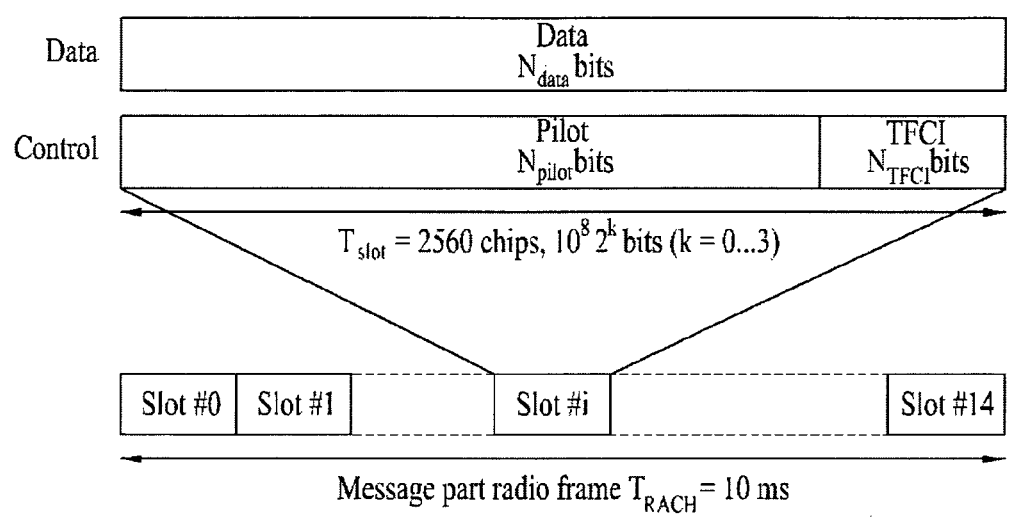
FIG. 9 illustrates the structure of the random access message part.
Figure 10:
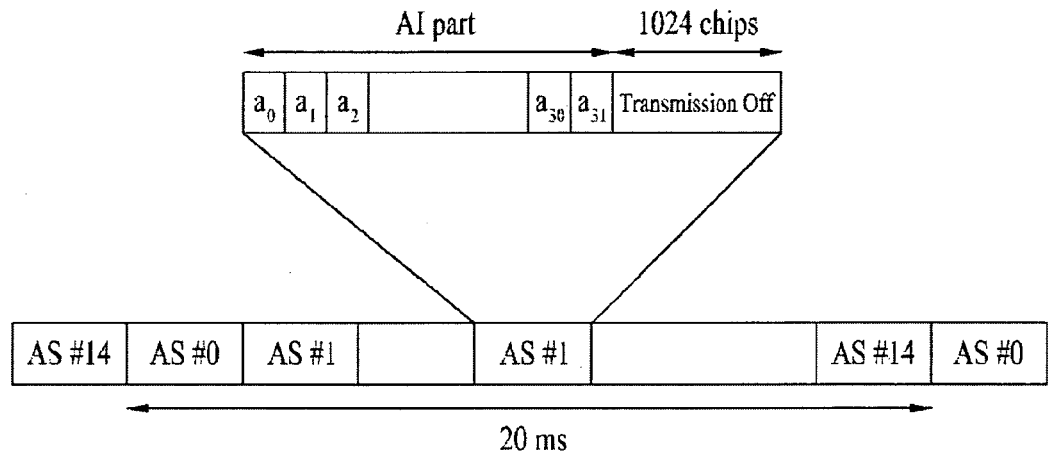
FIG. 10 illustrates the structure of the AICH.
Figure 11:
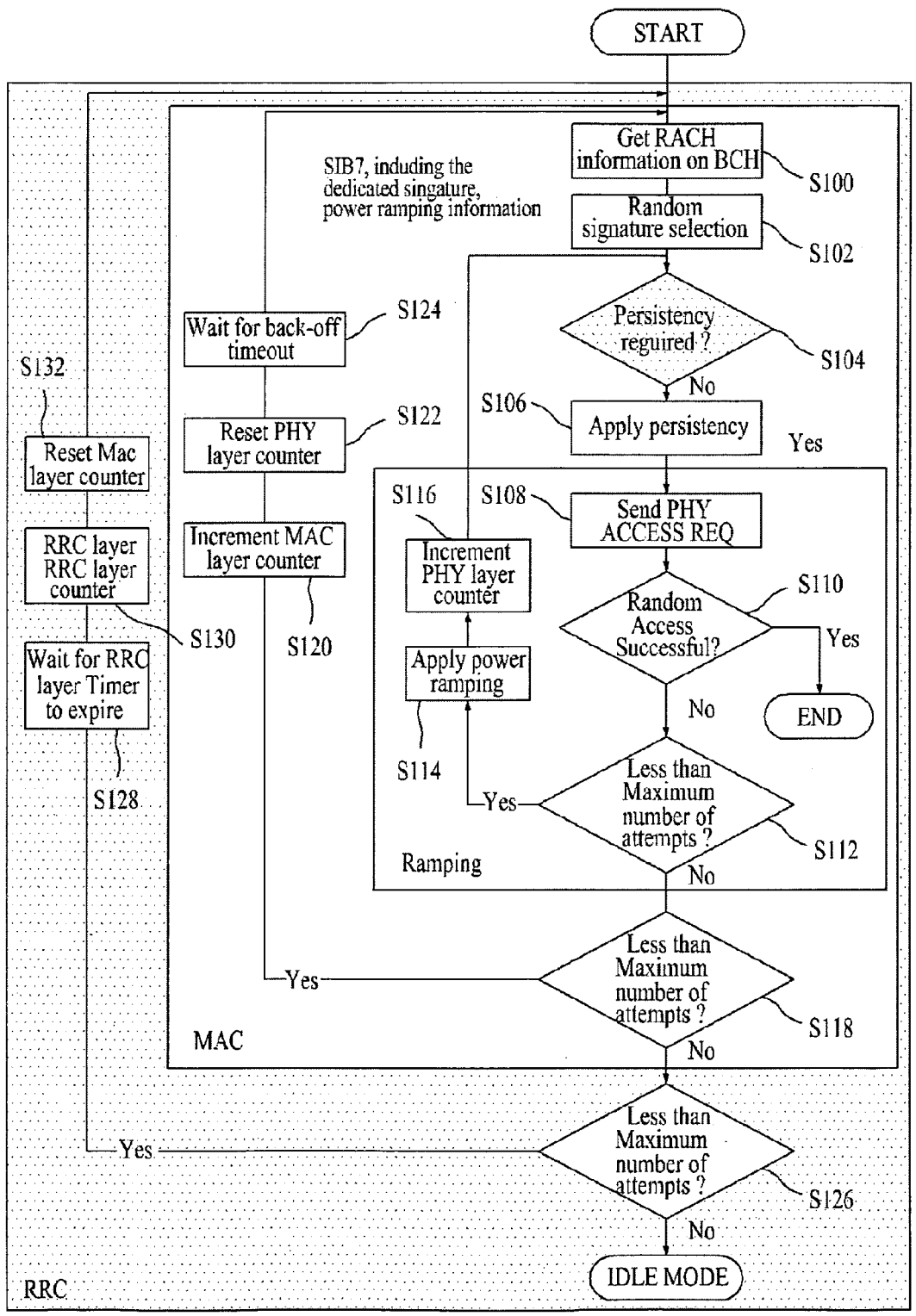
FIG. 11 illustrates a random access procedure for UMTS.
Figure 12:
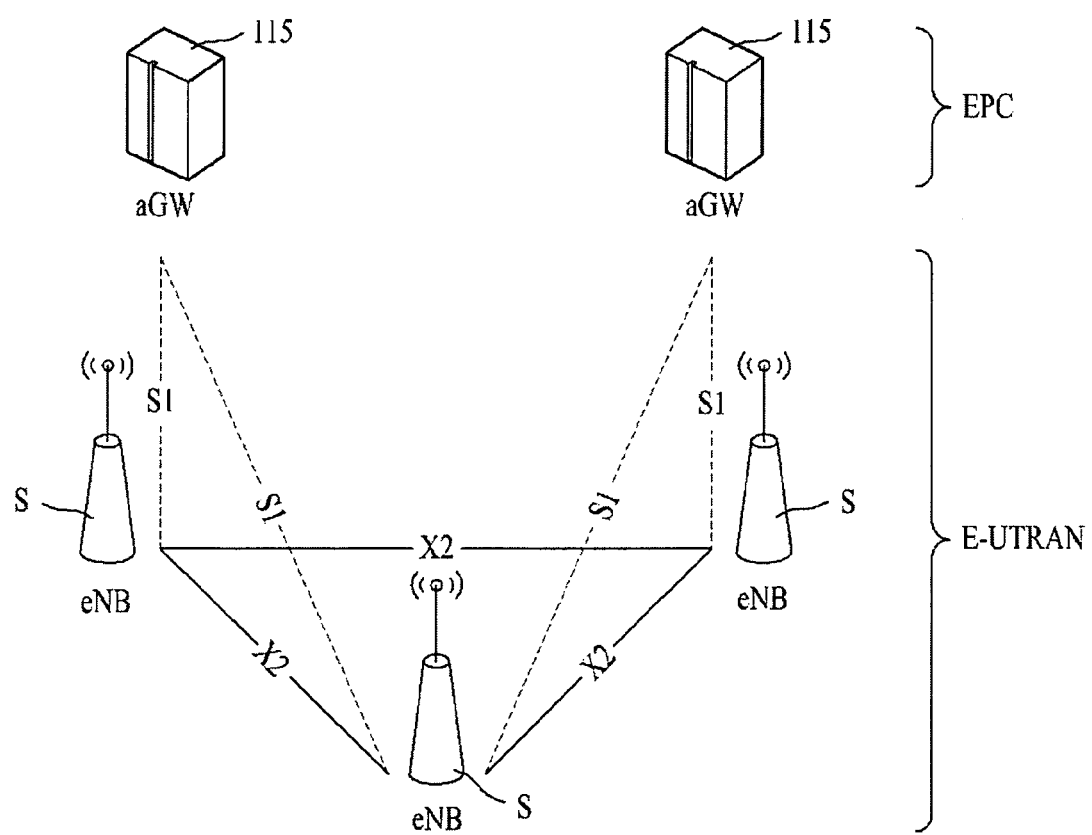
FIG. 12 illustrates an LTE system.
Figure 13:
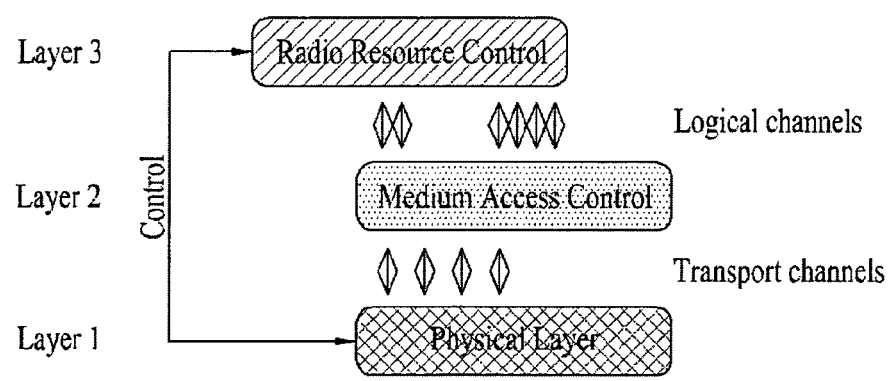
FIG. 13 illustrates radio interface architecture around the physical layer for LTE.
Figure 14:
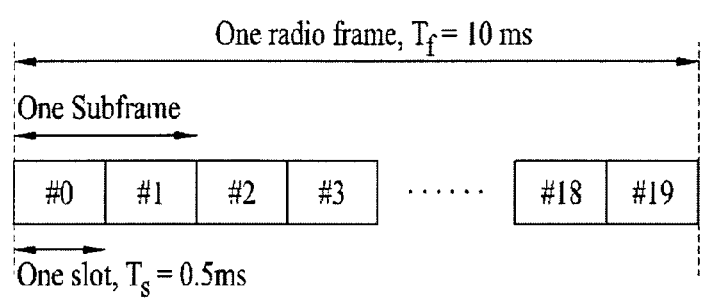
FIG. 14 illustrates the LTE Frame structure.
Figure 15A:
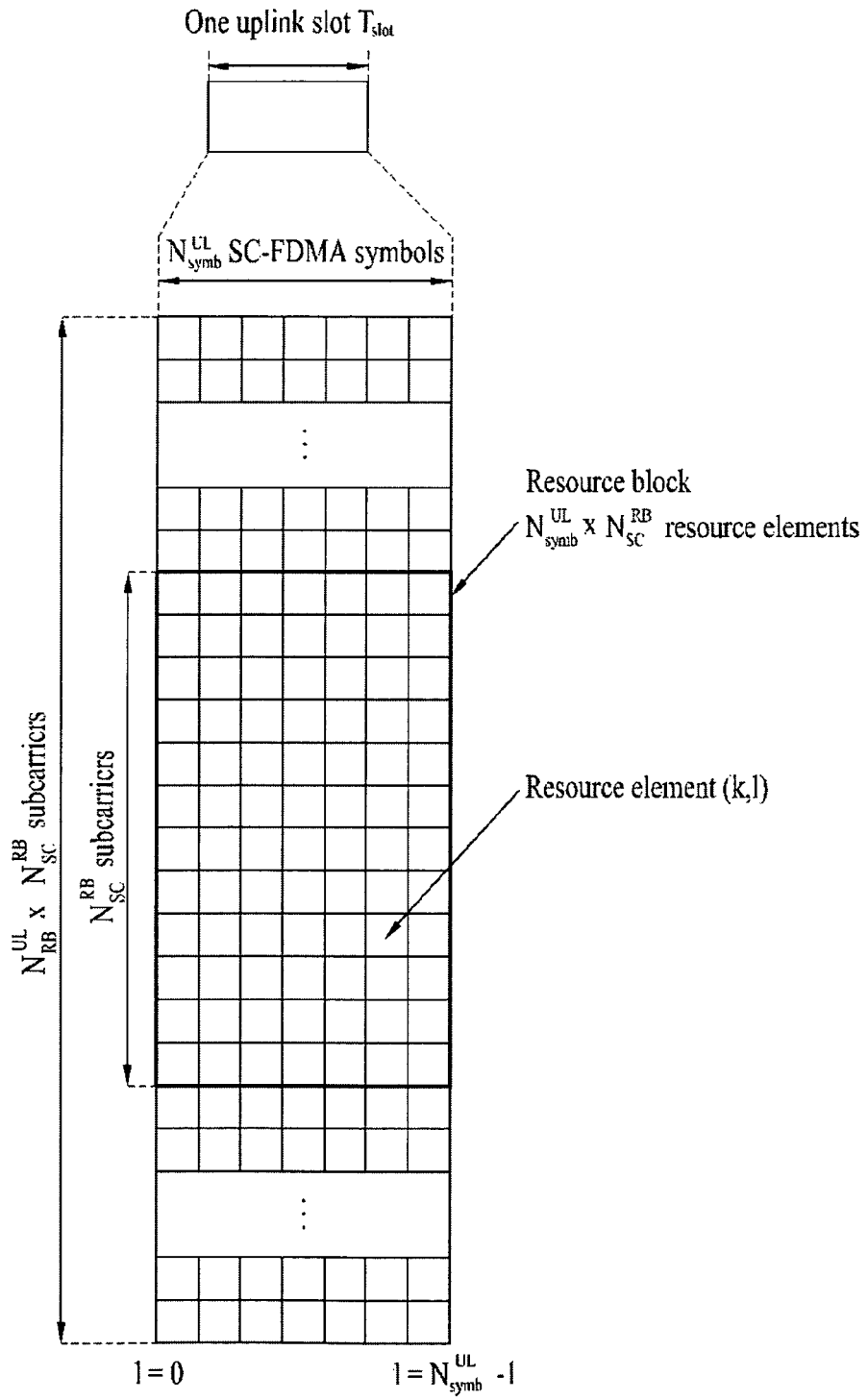
FIG. 15(a) illustrates the LTE resource grid for uplink.
Figure 15B:
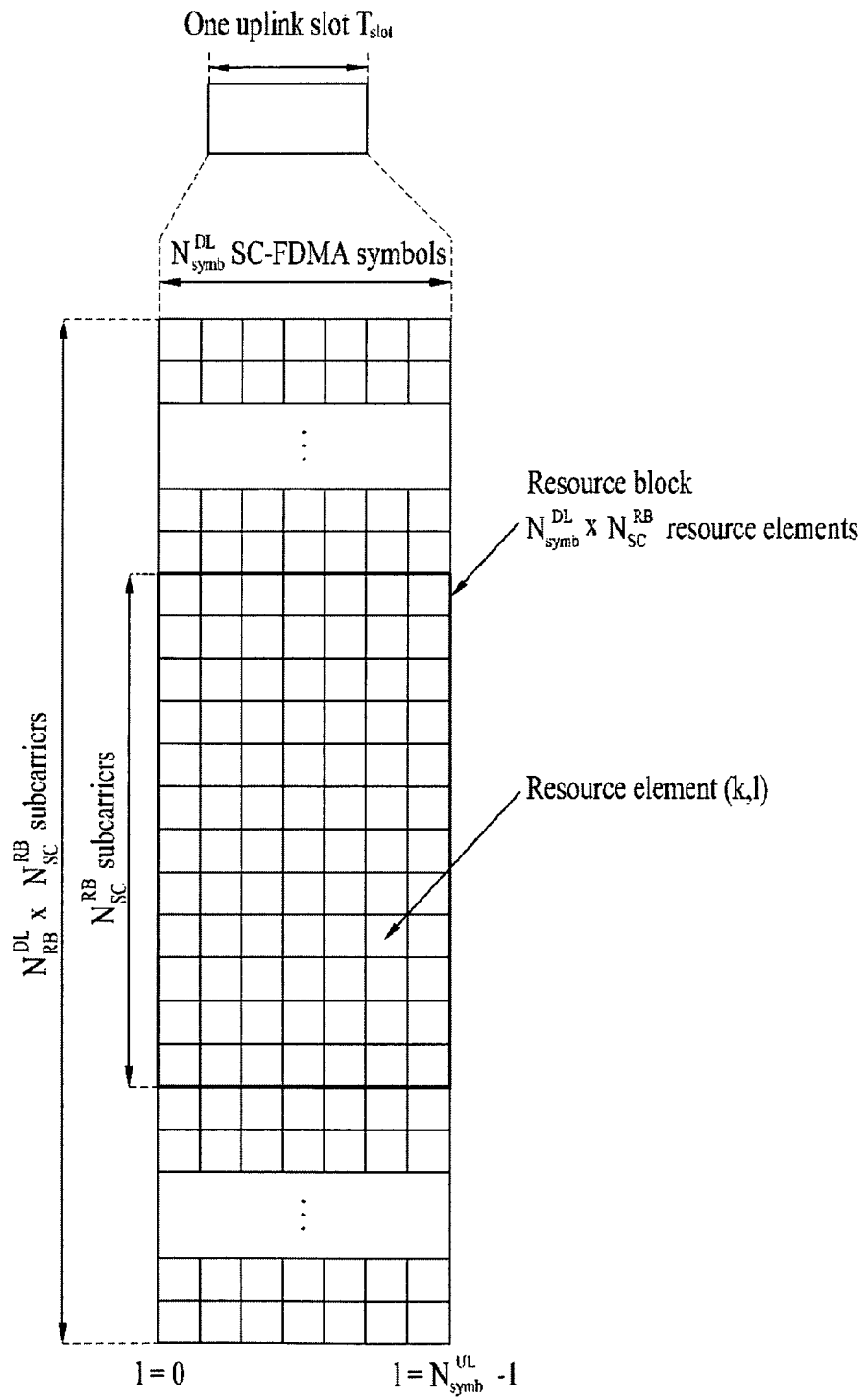
FIG. 15(b) illustrates the LTE resource grid for downlink.
Figure 16:
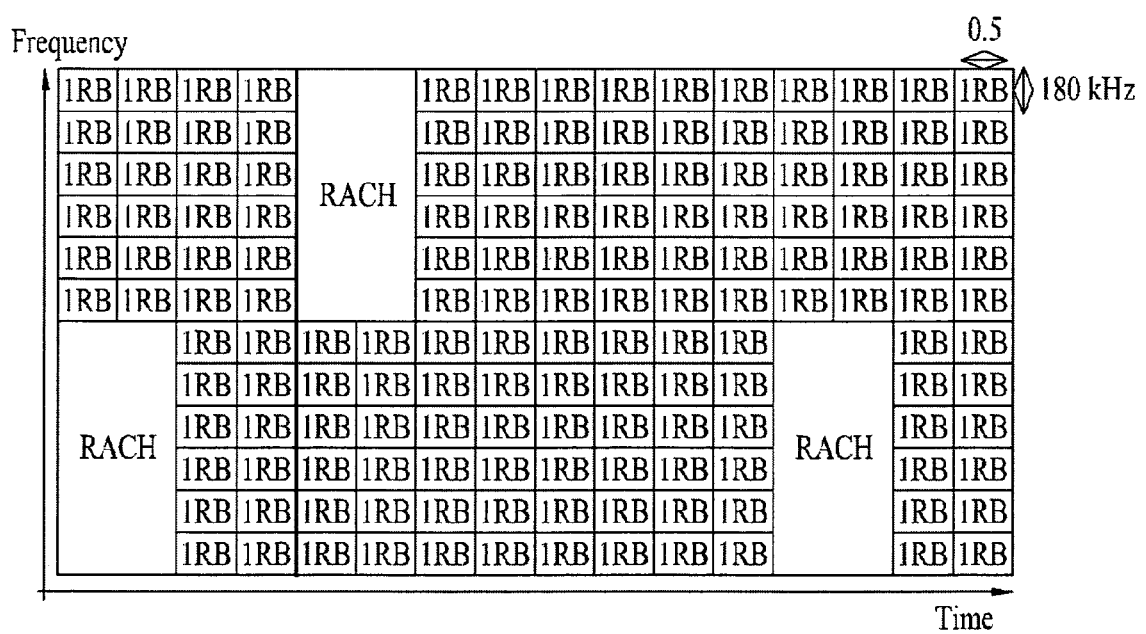
FIG. 16 illustrates an example of RACH slot location in a 2.5 MHz bandwidth of an LTE system.
Figure 17:
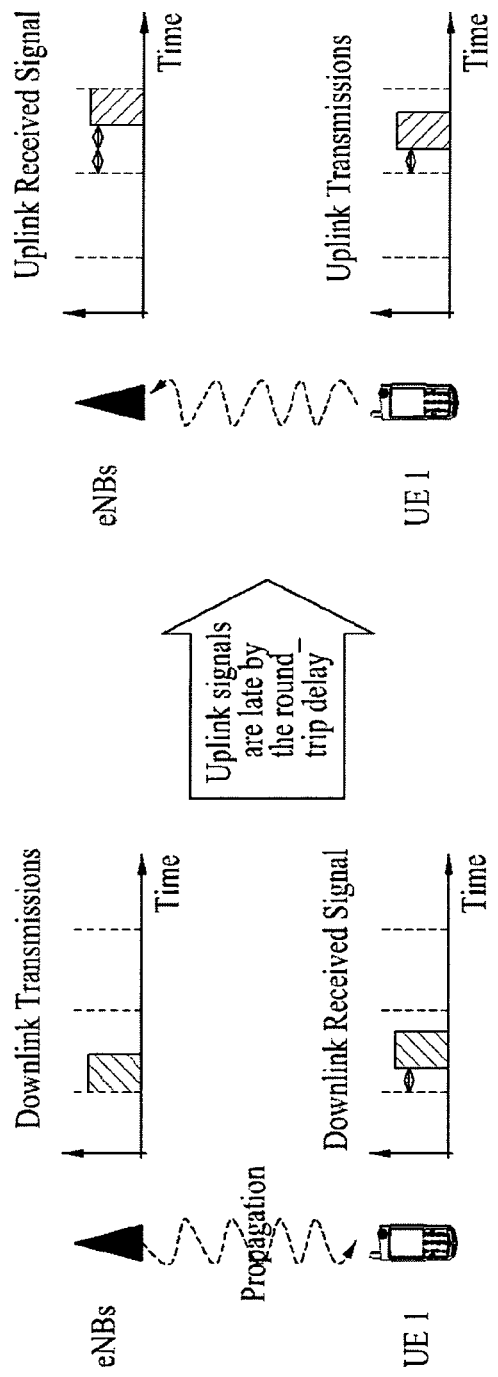
FIG. 17 illustrates propagation delay in an LTE system.
Figure 18:
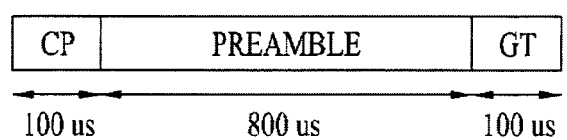
FIG. 18 illustrates a random access burst in an LTE system.
Figure 19:
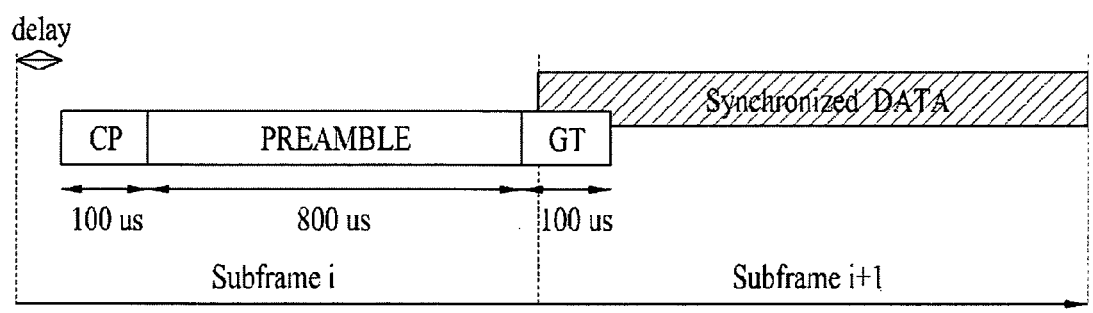
FIG. 19 illustrates a guard time in an LTE system.
Figure 20:
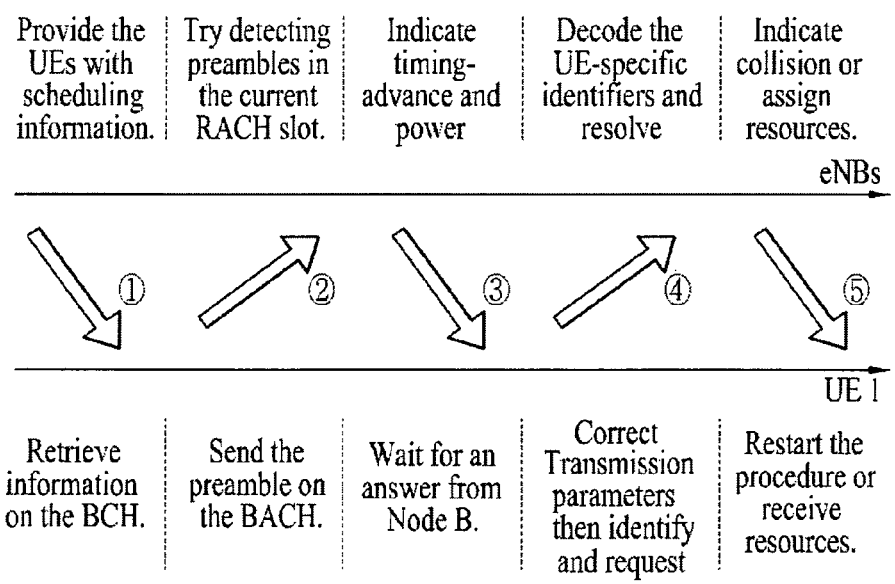
FIG. 20 illustrates messages transmitted during random access in an LTE system.
Figure 21:
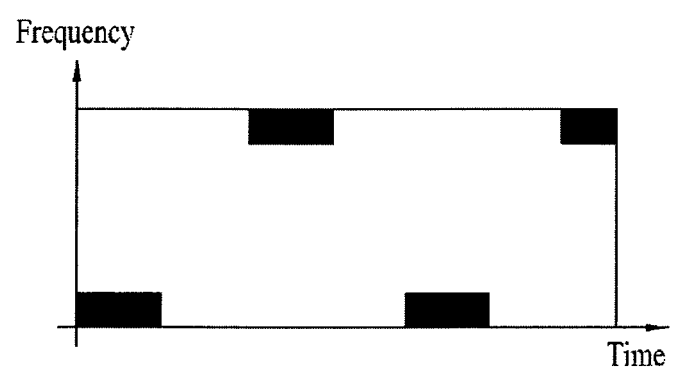
FIG. 21 illustrates a frequency hopping pattern in an LTE system.

One way to give priority to a UE 1 is to increase the number of random access attempts it can make. For example, giving a UE 1 a higher priority in the UMTS procedure would consist of increasing the product (N300*Mmax*Nmax) illustrated in FIG. 11. One possible way to do this would be to define the values of N300, Mmax and Nmax in the standard depending on the AC or depending on another attribute for the priority, such as the reason for contacting the eNB 5 or a cause value.

Only the M1max parameter would have to be increased in the LTE random access procedure illustrated in FIG. 22. However, the Hmax parameter can also change. The number of accesses that are performed before the procedure is terminated unsuccessfully would generally depend on the priority.

Figure 31:
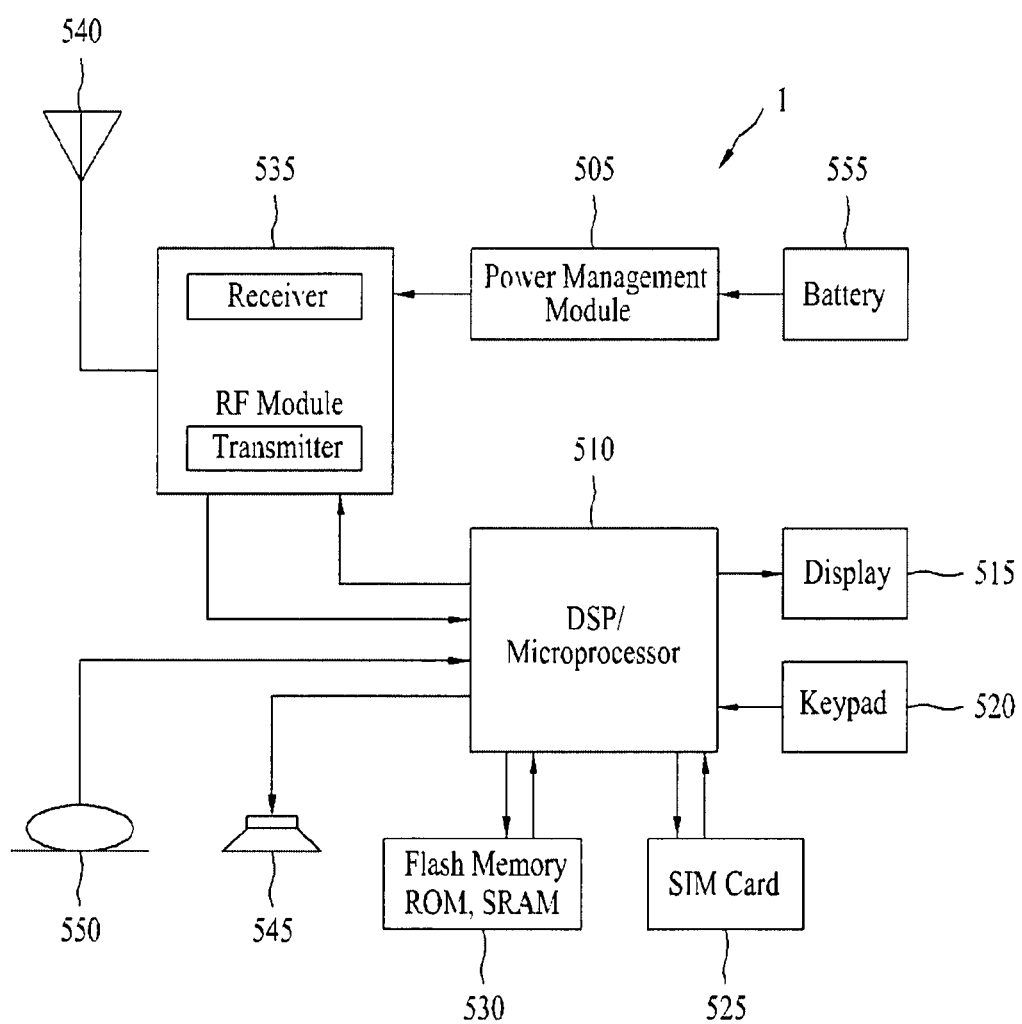
FIG. 31 illustrates a block diagram of a mobile station according to the present invention.

FIG. 31 illustrates a block diagram of a mobile station (MS) or UE 1. The UE 1 includes a processor (or digital signal processor) 510, RF module 535, power management module 505, antenna 540, battery 555, display 515, keypad 520, memory 530, SIM card 525 (which may be optional), speaker 545 and microphone 550.

A user enters instructional information, such as a telephone number, for example, by pushing the buttons of a keypad 520 or by voice activation using the microphone 550. The microprocessor 510 receives and processes the instructional information to perform the appropriate function, such as to dial the telephone number. Operational data may be retrieved from the Subscriber Identity Module (SIM) card 525 or the memory module 530 to perform the function. Furthermore, the processor 510 may display the instructional and operational information on the display 515 for the user's reference and convenience.

The processor 510 issues instructional information to the RF module 535, to initiate communication, for example, transmits radio signals comprising voice communication data. The RF module 535 comprises a receiver and a transmitter to receive and transmit radio signals. An antenna 540 facilitates the transmission and reception of radio signals. Upon receiving radio signals, the RF module 535 may forward and convert the signals to baseband frequency for processing by the processor 510. The processed signals would be transformed into audible or readable information outputted via the speaker 545, for example. The processor 510 also includes the protocols and functions necessary to perform the various processes described herein.

Depending on implementation, it is possible that the present invention can take the form of an entirely hardware embodiment, an entirely software embodiment or an embodiment containing both hardware and software elements. A software embodiment may include, but not be limited to, to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Other components may be coupled to the system. Input/output or I/O devices (including but not limited to keyboards, displays, pointing devices, etc.) can be coupled to the system either directly or through intervening I/O controllers. Network adapters (e.g., modem, cable modem, Ethernet cards) may also be coupled to the system to enable the data processing system to become coupled to other data processing systems or remote printers or storage devices through intervening private or public networks.

It should be understood that the logic code, programs, modules, processes, methods, and the order in which the respective elements of each method are performed are purely exemplary. Depending on the implementation, they may be performed in any order or in parallel, unless indicated otherwise in the present disclosure. Further, the logic code is not related, or limited to any particular programming language, and may be comprise one or more modules that execute on one or more processors in a distributed, non-distributed, or multiprocessing environment.

The method as described above may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multi-chip package (such as a ceramic carrier that has either or both surface interconnections of buried interconnections).

In any case, the chip is then integrated with other chips, discrete circuit elements, and/or other signal processing devices as part of either (a) an intermediate product, such as a motherboard, or (b) and end product. The end product can be any product that includes integrated circuit chips, ranging from toys and other low-end applications to advanced computer products having a display, a keyboard or other input device, and a central processor.

Therefore, it should be understood that the invention could be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The foregoing embodiments and advantages are merely exemplary and are not to be construed as limiting the present invention. The present teaching can be readily applied to other types of apparatuses.

The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

INDUSTRIAL APPLICABILITY

The present invention is directed to an initial access procedure in a mobile terminal using a Random Access Channel (RACH) and, specifically, to enhancements in the random access procedure of a Long-Term Evolution (LTE) system.

The invention claimed is:

1. A method of performing a random access procedure in a wireless communication system, the method comprising:
   receiving random access information through a broadcast channel, the random access information comprising at least random access signature information, a power ramping parameter or an access slot configuration parameter;
   initiating a random access procedure according to a cause parameter, the cause parameter corresponding to a condition requiring a new random access before each preamble transmission;
   selecting a first signature for use in the preamble, the first signature based on the random access signature information;
   determining a first access slot for transmission of the first signature on a random access channel, the first access slot based on the access slot configuration parameter;
   determining transmission power for transmission of the first signature;
   transmitting the preamble comprising the first signature using the determined first access slot;
   selecting a second signature which is different from the first signature for re-transmission of the preamble based on a system frame number (SFN) when the transmission of the preamble comprising the first signature is not successful; and
   determining a second access slot for the re-transmission of the second signature by applying a cyclic shift to the first access slot based on the SFN when the transmission of the preamble comprising the first signature is not successful, the second access slot not overlapping with the first access slot.

2. The method of claim 1, further comprising performing delay control prior to transmitting the preamble in order to reduce conflicts by multiple mobile terminals using the random access channel.

3. The method of claim 2, wherein the delay control is based on at least a number of preamble re-transmission, a random access channel load or a priority scheme of a mobile terminal.

4. The method of claim 2, wherein the delay control is performed only when re-transmitting the preamble.

5. The method of claim 1, further comprising:
   attempting re-transmission of the preamble for a predetermine time or until a receipt acknowledgement is received.

6. The method of claim 5, wherein the predetermined time comprises a maximum number of retransmissions based on a priority connection level of a mobile terminal.

7. The method of claim 5, further comprising no longer attempting re-transmission if access is no longer necessary or upon interruption of the random access procedure.

8. The method of claim 1, wherein determining the first access slot comprises selecting a random access slot offset in frequency or time in each successive transmission of the preamble.

9. The method of claim 1, wherein the condition to which the cause parameter corresponds is at least initial access of a base station, handover or losing synchronization.

10. The method of claim 1, wherein the transmission power is determined based on at least open loop power control, number of preamble retransmission or frequency of the determined access slot.

11. The method of claim 1, further comprising increasing the transmission power according to the power ramping parameter in each hopping cycle if it is determined that power ramping is necessary.

12. A mobile terminal for performing a random access procedure in a wireless communication system, the mobile terminal comprising:
   a transmitting unit transmitting signals;
   a receiving unit receiving random access information through a broadcast channel, the random access information comprising at least random access signature information, a power ramping parameter or an access slot configuration parameter;
   a display unit displaying information;
   an input unit receiving inputs from a user; and
   a processing unit initiating a random access procedure according to a cause parameter, selecting a first signature for use in the preamble, determining a first access slot for transmission of the first signature on a random access channel, determining transmission power for transmission of the first signature, controlling the transmitting unit to transmit the preamble comprising the first signature using the first access slot, selecting a second signature which is different from the first signature for re-transmission of the preamble based on a system frame number (SFN) when the transmission of the preamble comprising the first signature is not successful, and determining a second access slot for the re-transmission of the second signature by applying a cyclic shift to the first access slot based on the SFN when the transmission of the preamble comprising the first signature is not successful, the second access slot not overlapping with the first access slot,
   wherein the cause parameter corresponds to a condition requiring a new random access before each preamble transmission, the first signature is based on the random access signature information, and the first access slot is based on the access slot configuration parameter.

13. The mobile terminal of claim 12, wherein the processing unit further performs delay control prior to transmitting the preamble in order to reduce conflicts by multiple mobile terminals using the random access channel.

14. The mobile terminal of claim 13, wherein the processing unit performs the delay control based on at least a number of preamble re-transmission, a random access channel load or a priority scheme of the mobile terminal.

15. The mobile terminal of claim 13, wherein the processing unit performs the delay control only when re-transmitting the preamble.

16. The mobile terminal of claim 12, wherein the processing unit further attempts re-transmission of the preamble for a predetermined time or until a receipt acknowledgement is received.

17. The mobile terminal of claim 16, wherein the predetermined time comprises a maximum number of retransmissions based on a priority connection level of the mobile terminal.

18. The mobile terminal of claim 17, wherein the processing unit no longer attempts re-transmission if access is no longer necessary or upon interruption of the random access procedure.

19. The mobile terminal of claim 12, wherein the processing unit determines the first access slot by selecting a random access slot offset in frequency or time in each successive transmission of the preamble.

20. The mobile terminal of claim 12, wherein the condition to which the cause parameter corresponds is at least initial access of a base station, handover or losing synchronization.

21. The mobile terminal of claim 12, wherein the processing unit determines transmission power based on at least open loop power control, number of preamble retransmission or frequency of the determined access slot.

22. The mobile terminal of claim 12, wherein the processing unit increases the transmission power according to the power ramping parameter in each hopping cycle if it is determined that power ramping is necessary.

* * * * *